US006845678B2

(12) United States Patent
Igarashi et al.

(10) Patent No.: US 6,845,678 B2
(45) Date of Patent: Jan. 25, 2005

(54) SPECTACLE FRAME SHAPE MEASURING APPARATUS

(75) Inventors: Takashi Igarashi, Tokyo (JP); Hisanori Akiyama, Tokyo (JP); Masahiro Jinbo, Tokyo (JP); Ryosuke Sato, Tokyo (JP); Takashi Daimaru, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/409,974

(22) Filed: Apr. 7, 2003

(65) Prior Publication Data

US 2004/0016136 A1 Jan. 29, 2004

(30) Foreign Application Priority Data

Apr. 8, 2002 (JP) ....................................... 2002-105857
Dec. 11, 2002 (JP) ....................................... 2002-359326

(51) Int. Cl.[7] .......................... G01N 19/00; B43L 11/00; B43L 9/00; A61B 3/10; G01B 1/00
(52) U.S. Cl. ............................ 73/865.8; 33/28; 33/200; 33/507
(58) Field of Search ............................. 33/200, 507, 28, 33/558.01; 73/865.9, 104

(56) References Cited

U.S. PATENT DOCUMENTS

| 5,347,762 A | * | 9/1994 | Shibata et al. ................. 451/5 |
| 5,615,486 A |  | 4/1997 | Igarashi et al. ............... 33/200 |
| 6,170,321 B1 |  | 1/2001 | Suzuki et al. ................. 73/104 |

FOREIGN PATENT DOCUMENTS

| EP | 0 424 207 A1 | 4/1991 |
| EP | 0 689 900 A1 | 1/1996 |
| EP | 0 819 967 A1 | 1/1998 |
| EP | 1 050 373 A2 | 11/2000 |
| FR | 2 659 440 | 9/1991 |
| JP | 63-024106 A | 2/1988 |
| JP | 64-023721 A | 2/1989 |
| JP | 01-305308 A | 12/1989 |
| JP | 06-55126 U | 7/1994 |
| JP | 06-55128 U | 7/1994 |
| JP | 06-55130 U | 7/1994 |
| JP | 2000-317795 A | 11/2000 |

OTHER PUBLICATIONS

"GT–1000/Global Frame Tracer"Operating Manual.

* cited by examiner

Primary Examiner—Hezron Williams
Assistant Examiner—Tamiko Bellamy
(74) Attorney, Agent, or Firm—Blakely Sokoloff Taylor & Zafman

(57) ABSTRACT

A spectacle frame shape measuring apparatus includes a measurement element holding mechanism. The measurement element holding mechanism holds a measurement element in a substantially loadless state along a frame groove formed in the inner circumferential surface of a rim of a spectacle frame. The measurement element holding mechanism includes a rod, balance spring, and evacuating mechanism. The rod is vertically movable and has an upper end portion on which the measurement element is mounted. The balance spring pushes the rod upward to hold the measurement element at a loading position during shape measurement. The evacuating mechanism regularly evacuates the measurement element to an evacuation position, thereby performing three-dimensional measurement of a rim shape. A spectacle frame shape measuring apparatus holder is also disclosed.

17 Claims, 20 Drawing Sheets

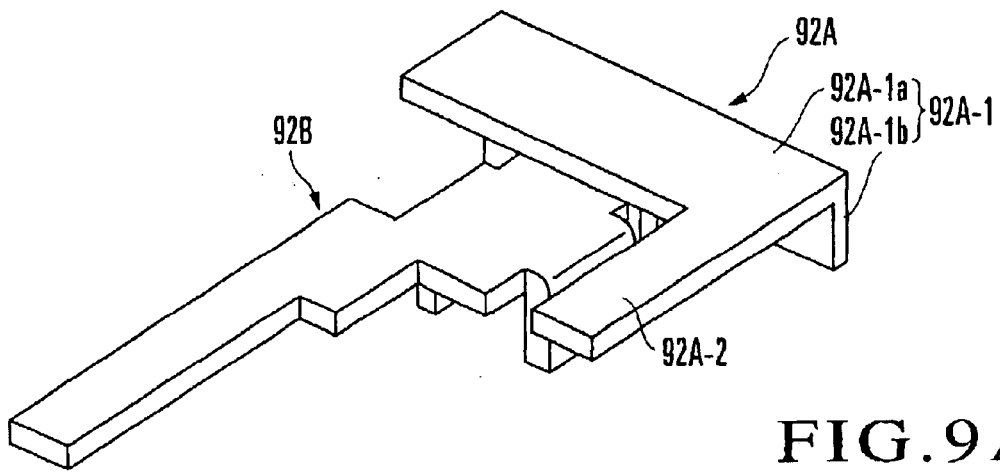
FIG.9A
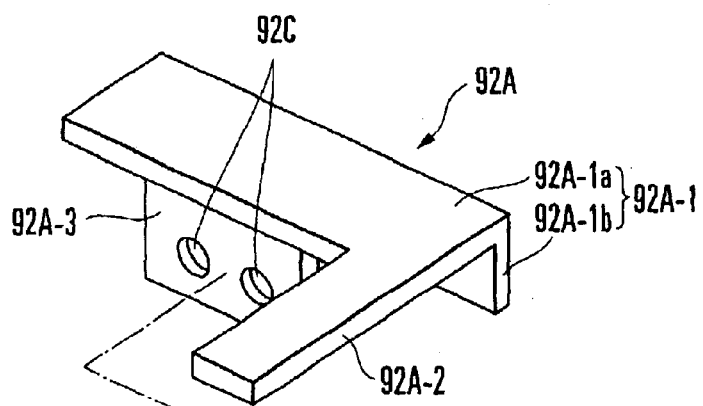
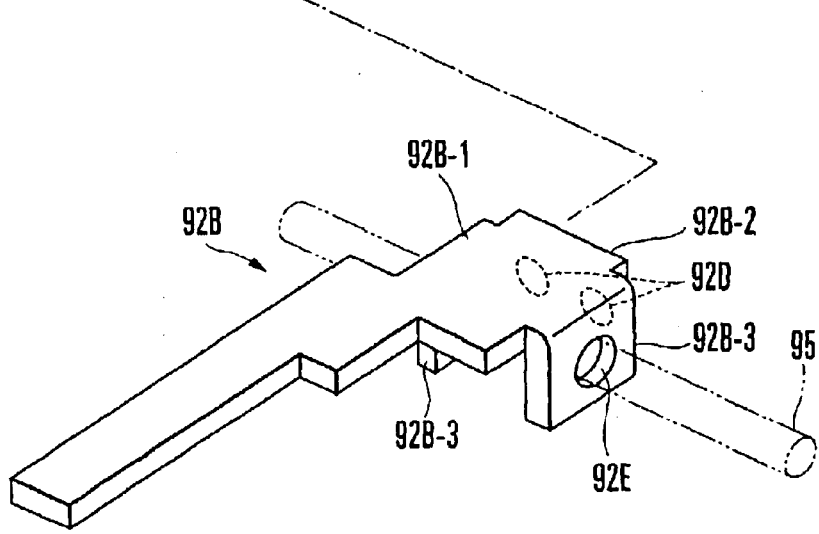
FIG.9B

| SWITCH | LEFT (L) | | RIGHT (R) | |
|---|---|---|---|---|
| | FRAME TEMPLATE | DUMMY LENS | FRAME TEMPLATE | DUMMY LENS |
| SW1 | ON | OFF | OFF | OFF |
| SW2 | OFF | ON | OFF | OFF |
| SW3 | OFF | OFF | ON | OFF |
| SW4 | OFF | OFF | OFF | ON |
| SW5 | ON | ON | ON | ON |

FIG. 28

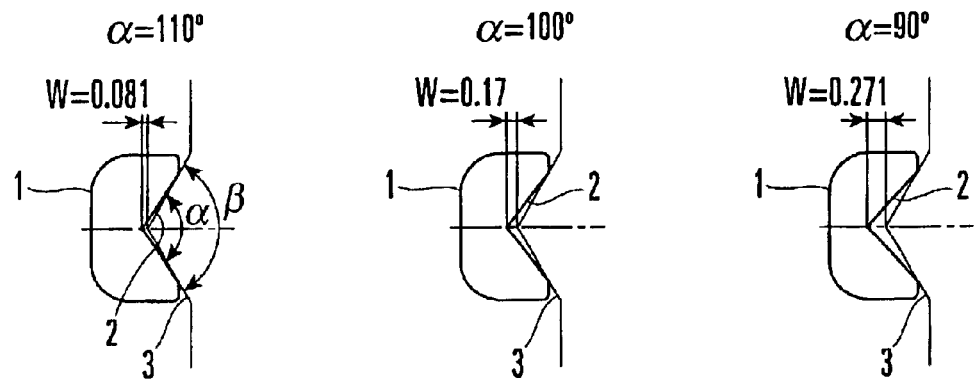
FIG.32(a) PRIOR ART  FIG.32(b) PRIOR ART  FIG.32(c) PRIOR ART
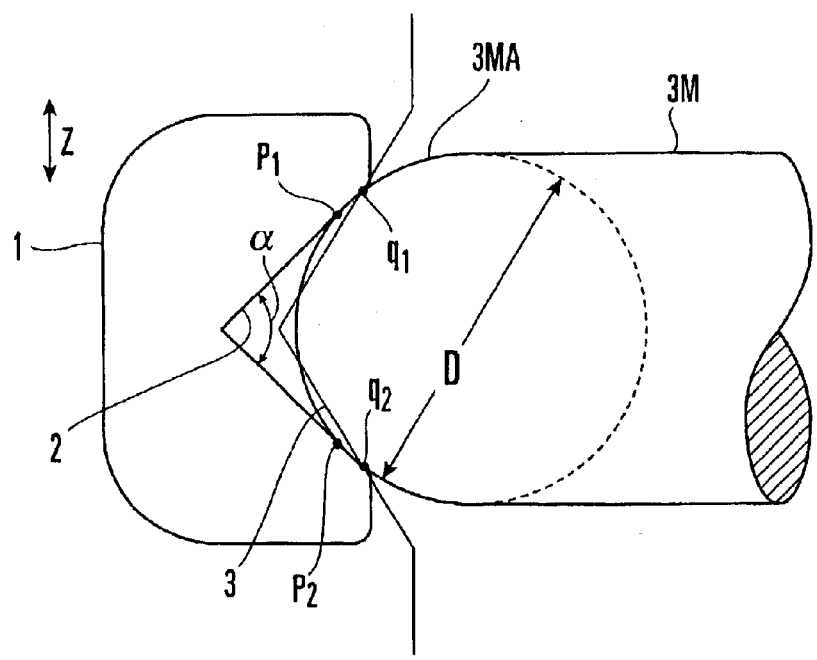
FIG. 33 PRIOR ART

US 6,845,678 B2

SPECTACLE FRAME SHAPE MEASURING APPARATUS

BACKGROUND OF THE INVENTION

The present invention relates to a spectacle frame shape measuring apparatus for measuring the frame shape of a spectacle frame and the shape of a frame template or lens and a holder used to mount the frame template and lens on the spectacle frame shape measuring apparatus.

The shape of a frame rim (rim) of a spectacle frame when viewed from the top is generally curved along the face of a wearer. For this reason, shape measurement is performed in three dimensions by a spectacle frame shape measuring apparatus. The measurement data is therefore expressed in a cylindrical coordinate system with r (the displacement of a measurement element in the radial direction), θ (the displacement of the measurement element in the rotational direction in a horizontal plane with reference to an arbitrary point on the measurement element), and Z (the displacement of the measurement element in the height direction). For this reason, the spectacle frame shape measuring apparatus includes a horizontal driving mechanism for driving the measurement element in the radial direction, a rotational driving mechanism for rotating the measurement element in a horizontal plane, and a vertical driving mechanism for vertically driving the measurement element. In shape measurement, the measurement element is moved along the frame groove formed in the inner circumferential surface of a rim to measure the displacements r, θ, and Z. These displacement amounts are arithmetically computed to measure the shape of the rim (e.g., Japanese Utility Model Laid-Open Nos. 6-55130 and 6-55126).

FIG. 30 shows a vertical driving mechanism for a measurement element used in a conventional spectacle frame shape measuring apparatus. Note that this apparatus is of a magnetic type as a representative example. Referring to FIG. 30, reference numeral 1 denotes the rim (frame rim) of a spectacle frame; 2, a frame groove which is a groove with a V-shaped cross-section formed in the inner circumferential surface of the rim 1; 3, a measurement element; 4, a rotating table which is movable in a lateral direction and rotatable; 5, a slider disposed in the rotating table 4; and 6, a vertical driving mechanism for the measurement element 3 (a conventional apparatus having such a structure includes, for example, frame tracer GT1000 available from HOYA CORP.).

The slider 5 is coupled to a motor-driven wire (not shown) to be moved, and is biased in one direction by a constant force spring. With this arrangement, at the time of shape measurement, the measurement element 3 is pressed again the frame groove 2 of the rim 1 in the radial direction with a predetermined measurement force F (e.g., F=40 g).

The vertical driving mechanism 6 is constituted by a rod 7 having the measurement element 3 attached to the upper end, a pivot lever 8 which supports the rod 7 to be vertically movable, a linear stepping actuator 9 which pushes the pivot lever 8 upward at the time of shape measurement, and the like. The rod 7 extends through the slider 5 so as to be vertically moved and inhibited from rotating. A pin 11 is rotatably mounted in the intermediate portion of the rod 7 through a bearing 12. A linear sensor 13 for detecting the vertical movement of the rod 7 as the displacement (Z) of the measurement element 3 in the vertical direction is disposed on the lower end side of the rod 7. A specific example of this linear sensor will be described later with reference to FIGS. 30 and 31. The operation of this sensor will be described later. When no measurement is made, the rod 7 is released from the pivot lever 8 and moved to the lowermost position by its own weight, thereby evacuating the measurement element 3 to an evacuation position T which is the lowermost position.

The intermediate portion of the pivot lever 8 is axially supported by a shaft 14 so as to be pivotal in the vertical direction, and a proximal end portion 8a is biased upward by a helical extension spring 15. This provides the pivot lever 8 with a habit of pivoting counterclockwise in FIG. 30. In the normal state, a distal end portion 8b is pressed against the upper surface of a lower plate 5A of the slider 5 through a buffer member 16 made of rubber or the like so as to bear and support the pin 11 from below.

The linear stepping actuator 9 serves to push the measurement element 3 upward from the evacuation position T to a loading position Rd at the time of shape measurement, and is fixed to the lower plate 5A so as to be located immediately below the pivot lever 8. When no measurement is made, the linear stepping actuator 9 lowers a screw rod 17 to the home position (lowermost position) where it does not come into contact with the pivot lever 8. As the linear stepping actuator 9 is energized, the screw rod 17 rotates and rises to push the pivot lever 8 upward from below. As a consequence, the pivot lever 8 pivots clockwise about the shaft 14 to push the pin 11 upward. Therefore, the rod 7 is also pushed upward to move the measurement element 3 from the slider 5 to the loading position Rd indicated by the chain double-dashed lines.

The measurement unit including the slider 5 is moved to a left eye measurement position or right eye measurement position by driving of a motor (not shown). Thereafter, the measurement element 3 is moved to the loading position Rd indicated by the chain double-dashed lines by another driving motor and wire driving, and a contact portion 3A of the measurement element 3 is pressed against the groove wall of the frame groove 2. The slider 5 then holds the state wherein the contact portion 3A is pressed against the groove wall of the frame groove 2 by the constant force spring (see FIG. 12 to be described later). Subsequently, as the driving direction of the linear stepping actuator 9 changes, the screw rod 17 gradually moves downward to return to the home position. As a consequence, as the screw rod 17 moves downward, the pivot lever 8 is also pivoted and lowered by the biasing force of the helical extension spring 15 to return to the original state indicated by the solid lines in FIG. 30.

On the other hand, the contact portion 3A of the measurement element 3 is pressed against the frame groove 2 by the constant force spring with the predetermined measurement force F, and hence the measurement element 3 does not fall even without the support of the pivot lever 8. When the rotating table 4 is rotated in this state, the contact portion 3A of the measurement element 3 moves along the frame groove 2 to perform shape measurement (r, θ, Z) of the rim 1.

In measuring the shape of the frame groove 2, as the rotating table 4 rotates, the slider 5 moves in a lateral direction, and the contact portion 3A of the measurement element 3 vertically moves along the frame groove 2, thereby detecting the displacement (r) of the slider 5 on the rotating table 4 in a lateral direction, the rotational angle θ of the slider 5, and the displacement Z of the rod 7 in the vertical direction. With this operation, the shape of the rim is three-dimensionally measured. The rotational angle (θ) of the rotating table 4 can be measured by a control method for a pulse motor (stepping motor) or the like without preparing any detection means.

When a rim shape is to be measured, a measurement element having a shape conforming to the rim groove of the frame must be used. For this reason, conventionally, for example, a feeler in the form of an abacus counter is used as a measurement element. The angle of the vertex portion of this feeler is set to be equal to the groove angle (120° according to the industry standard) of the bevel grinding wheel of a lens edger (for example, Japanese Patent Publication No. 1-23721).

In the frame shape measuring apparatus disclosed in Japanese Patent Publication No. 1-23721, the shape of the measurement element is made to almost conform to the shape of the bevel grinding wheel as a lens cutting tool. This eliminates the necessity to correct working with respect to measurement data.

When the shape measurement is completed, the actuator 9 is driven to raise the screw rod 17 to make the screw rod 17 push the pivot lever 8 upward to the height position of the pin 11. The slider 5 then moves backward to evacuate the contact portion 3A of the measurement element 3 from the frame groove 2.

When the contact portion 3A of the measurement element 3 evacuates from the frame groove 2, since the rod 7 itself tries to move downward due to its own weight, the pivot lever 8 bears and supports the bearing 12. As the driving direction of the actuator 9 changes afterward, the screw rod 17 moves downward to make the pivot lever 8 gradually pivot and move downward to return to the home position. For this reason, the rod 7 also gradually moves downward together with the pivot lever 8, thus preventing the rod 7 from abruptly falling.

The above rim shape measurement using the measurement element is sequentially performed for the left and right rims (see, for example, Japanese Utility Model Laid-Open No. 6-55128).

The spectacle frame holder disclosed in Japanese Utility Model Laid-Open No. 6-55128 which holds a spectacle frame can freely move in a lateral direction. By moving this apparatus to the left or right, measurement for the right rim and measurement for the left rim are switched. When such rim measurement operations are to be switched, the measurement element is temporarily evacuated below by a driving unit to prevent the rim from coming into contact with the measurement element.

As a Z-axis measuring unit for measuring the displacement Z in the height direction, in particular, in measuring the shape of a rim by using the above measurement element, an optical measuring unit (see, for example, Japanese Patent Laid-Open No. 1-305308) or a magnetic measuring unit is used.

As shown in FIG. 31, an optical Z-axis measuring unit A is designed such that a charge-coupled device (CCD) line image sensor B and a light-emitting diode C serving as a light source are arranged to oppose each other through the lower end portion of a measurement element D. As the measurement element D moves vertically, the boundary between the shadow of the measurement element D and a bright portion which is formed on the CCD line image sensor B moves vertically. Therefore, by detecting the distance from an end of the measurement surface of the CCD line image sensor B to this boundary, a displacement Z of the measurement element D in the vertical direction can be measured.

Rimless spectacles are designed such that lenses are held by suspending their lower portions with nylon threads or lenses called a two-point frame or three-piece frame are held with screws extending through screw holes formed in the lenses. In this case, since no frame shape can be measured, a frame temperate in the form of a flat plate is prepared, and the shape of the frame temperate is measured. When processed lenses are edged to be reduced in size and mounted in a spectacle frame having a suitable size, shape measurement is performed for the lenses themselves. For this reason, a spectacle frame shape measuring apparatus of this type has a holder as an attachment. When a frame template or lens is to be measured, the frame template or lens is fixed on the holder, and the holder is mounted on the apparatus.

As a holder used in a spectacle frame shape measuring apparatus, a template holder is known (see, for example, Japanese Patent Laid-Open No. 2000-317795). This template holder has the following components in its main body: a template holding portion having a movable shaft which is a shaft to be engaged with a central hole formed in a template (frame template) and can move in the radial direction of the template, an elastic member which biases the movable shaft in the radial direction of the template, and a push member for returning the movable shaft in a direction opposite to the biasing direction of the elastic member. The template holder body also incorporates a dummy lens holding portion having a movable member for pressing the base of a cup to which a dummy lens is fixed. The above elastic member presses the movable member against the base of the cup. One surface of the template holder body is used as a template holding portion, and the reverse surface to this one surface is used as a dummy lens holding portion. Using the template body while turning it over makes it possible to perform shape measurement for a template and dummy lens by using the single holder.

The above spectacle frame shape measuring apparatus, however, involves various problems as described below.

First of all, since the measurement element 3, rod 7, pin 11, bearing 12, and the like constitute the movable member 18 which moves vertically at the time of shape measurement for the rim 1, it is preferable that the displacement Z of the measurement element 3 in the vertical direction be measured after the weight of the movable member 18 is minimized so as not to apply a load on the frame groove 2.

In the conventional vertical driving mechanism 6 described above, however, since the contact portion 3A of the measurement element 3 is pressed against the groove wall of the frame groove 2 with the measurement force F by the constant force spring which biases the slider 5 in one direction so as to engage the measurement element 3 with the frame groove 2, the overall weight of the movable member 18 is applied as a load onto the frame groove 2, and the frictional force between the frame groove 2 and contact portion 3A is increased by this load and the measurement force F. For this reason, if, for example, the contact portion 3A of the measurement element 3 cannot be smoothly moved along the frame groove 2 due to changes in parts over time and the like, the contact portion comes off the frame groove 2. As a consequence, the displacement Z in the vertical direction cannot be accurately measured.

If the spring force of the constant force spring is reduced to decrease the measurement force F so as to improve the follow-up characteristics of the contact portion 3A with respect to the frame groove 2, the contact portion 3A easily comes off the frame groove 2.

According to the frame shape measuring apparatus disclosed in Japanese Patent Publication No. 1-23721 described above, the feeler in the form of an abacus counter tends to come off a thin frame groove, and it is difficult to smoothly control the rotation of the feeler. In addition, if the opening angle of a frame groove changes, the contact position between the feeler in the form of an abacus counter and the frame groove changes, resulting in a measurement error in the displacement r in the radial direction. More specifically, as shown in FIG. 32A, the frame groove 2 of the rim 1 of the spectacle frame is generally formed into a V-shaped groove with an opening angle α of 110°. However, depending on spectacle frames, frame grooves have α=100° and 90°, as shown in FIGS. 32B and 32C. If, therefore, rim shapes are measured by using the measurement element 3 having a vertex portion with an angle β of 120°, a distance W between the groove bottom and the measurement element 3 varies depending on the opening angle α of the frame groove 2. The distance W increases as the opening angle α decreases.

This distance W becomes a measurement error in the displacement r in the radial direction. For this reason, in order to obtain true frame shape data, actually measured values must be corrected by adding different correction values thereto for the respective types of frame grooves 2 (for example, with opening angles α of 110°, 100°, and 90°).

In addition, since a unit or attachment for measuring the opening angle α of the frame groove 2 is required, the manufacturing cost of the measuring apparatus itself increases.

In the case of a measurement element 3M having a hemispherical contact portion, as shown in FIG. 33, contact point $P_1$ and $P_2$ can be moved to the deeper side of the frame groove 2 than the contact points $q_1$ and $q_2$ of the measurement element 3 in the form of an abacus counter with the frame groove 2, and hence the measurement element 3M does not easily come off the frame groove 2 even with an abrupt change in the displacement Z in the height direction of the frame groove 2.

However, as a diameter D of a contact portion 3MA of a measurement element 4 increases, the contact points $P_1$ and $P_2$ move away from the groove bottom of the frame groove 2 as in the case of the measurement element 3 in the form of an abacus counter. As a consequence, the measurement element 3M tends to come off the frame groove 2 during measurement.

In the conventional spectacle frame shape measuring apparatus described above, when shape measurement for the frame groove 2 is completed, and the measurement element 3 is temporarily evacuated to the evacuation position T at a lower position, the actuator 9 is driven to raise the screw rod 17 to push the pivot level 8, thereby supporting the pin 11 from below. The actuator 9 is then driven in the reverse direction to lower the screw rod 17 to gradually lower the rod 7 together with the pivot level 8, thereby preventing the rod 7 from abruptly falling.

However, because of the structure in which the movable member constituted by the measurement element 3, rod 7, pin 11, bearing 12, and the like is lowered by its own weight to evacuate the measurement element 3 to the evacuation position T, if the movable member is snagged in the process of movement due the friction between the slider 5 and the rod 7 or the like, the measurement element 3 cannot be evacuated to the evacuation position T.

Consider further the Z-axis measuring unit. The conventional Z-axis measuring unit A shown in FIG. 31 uses the lower end portion of the measurement element D as a component of the measuring unit. For this reason, the measurement element D must be elongated by the length measured by the Z-axis measuring unit A. As a consequence, the lower end portion of the measurement element D extends below a slide plate E to increase the height of the spectacle frame shape measuring apparatus itself, resulting in hindering the formation of a compact structure.

In a conventional Z-axis measuring unit 13 shown in FIG. 30, as in the Z-axis measuring unit A, a sensor rod 13B integrally extends from the lower end of the rod 7, and hence the total length of the rod 7 increases, resulting in difficulty in decreasing the height of the spectacle frame shape measuring apparatus.

As described above, shape measurement for spectacles of a type using no frame rim is performed by using a frame template and template holder.

A conventional holder uses a screw as a pushing member, and a template is attached to or detached from the template holder by rotating the pushing member so as to move a movable shaft forward or backward. If, therefore, the pushing member moves a long distance, the pushing member must be rotated many times. Therefore, the template cannot be attached or detached at one touch, and it takes much time for attachment/detachment, resulting in poor handling.

In addition, since the elastic member biases the movable shaft through the movable member, when a dummy lens is to be attached or detached, the movable shaft and movable member must be moved against the elastic member by rotating the pushing member. For this reason, the dummy lens cannot be attached or detached at one touch either; a long period of time is required for attachment or detachment.

The above conventional spectacle frame shape measuring apparatus has three measurement modes, i.e., a spectacle frame measurement mode, frame template measurement mode, and lens measurement mode. In addition, a spectacle frame has left and right rims, left and right frame templates, and left and right lenses. Therefore, in each measurement mode, whether measurement is to be done on the left side or right side must be designated.

Conventionally, therefore, when measurement is to be done, the operator operates a button provided on a control panel to designate one of the spectacle frame measurement mode, frame template measurement mode, and lens measurement mode, and to also designate whether to perform measurement on the left side or right side.

Making two designations, i.e., designation of a measurement mode and designation of measurement on the left side or right side, in this manner imposes a heavy mental burden on the operator. This may cause a designation error.

SUMMARY OF THE INVENTION

It is a principal object of the present invention to provide a spectacle frame shape measuring apparatus which can reduce a measurement pressure applied to a contact portion of a measurement element with respect to a frame groove by inserting a movable member including the measurement element, a rod, and the like into the frame groove in an almost loadless state, prevent the contact portion from coming off the frame groove, deformation of rims, and the like, and accurately measure a displacement in the vertical direction.

It is another object of the present invention to provide a spectacle frame shape measuring apparatus which can perform accurate measurement without causing a measurement element to come off even frame grooves having different opening angles during the measurement, and correct a measurement value regardless of the opening angle.

It is still another object of the present invention to provide a spectacle frame shape measuring apparatus which can reliably evacuate a measurement element from a loading position to an evacuation position without causing it to stop during movement by forcibly evacuating it instead of by the self weight.

It is still another object of the present invention to provide a spectacle frame shape measuring apparatus which can decrease the height of the apparatus itself by devising the arrangement of a Z-axis measuring unit for measuring the displacement of a measurement element in the height direction.

It is still another object of the present invention to provide a holder which allows a frame template used for shape measurement of rimless spectacles to be attached and detached more quickly than in the prior art, thereby improving handling.

It is still another object of the present invention to provide a holder which allows a lens to be quickly attached and detached, thereby improving handling.

It is still another object of the present invention to provide a spectacle frame shape measuring apparatus which can automatically discriminate whether a measurement mode for a frame template or lens is set, and measurement is to be done on the left or right side.

In order to achieve the above objects, according to the present invention, there is provided a spectacle frame shape measuring apparatus comprising a measurement element holding mechanism which holds a measurement element in a substantially loadless state along a frame groove formed in an inner circumferential surface of a rim of a spectacle frame, the measurement element holding mechanism including a vertically movable rod having an upper end portion on which the measurement element is mounted, a balance spring which pushes the rod upward to hold the measurement element at a loading position during shape measurement, and an evacuating mechanism which regularly evacuates the measurement element to an evacuation position, thereby performing three-dimensional measurement of a rim shape.

According to the present invention, there is provided a spectacle frame shape measuring apparatus holder which holds a frame template used to measure a frame shape of a rimless spectacle frame shape, comprising a holder body having a template mount portion, a set screw which extends through a central hole formed in the center of the frame template to fix the frame template to the template mount portion, and a fixing pin which fixes the set screw to the template mount portion, wherein the set screw has a male thread portion, the template mount portion has a mount hole in which the set screw is inserted, the set screw has a pin guide groove which is formed in a surface of the male thread portion in an axial direction, and the fixing pin has a distal end portion protruding into the screw mount hole from a direction orthogonal to an axis of the screw mount hole, is located in the pin guide groove when inserted into the screw mount hole, and engages with a thread groove of the male thread portion of the set screw to fix the set screw when the set screw is fastened.

According to the present invention, there is provided a spectacle frame shape measuring apparatus holder which holds a frame template used to measure a frame shape of a rimless spectacle frame shape, comprising a holder body having a lens mount portion, the lens mount portion including a cup shaft fixed in the holder body, a leap cup which is detachably fitted on the cup shaft and holds a lens, a lens press shaft which has a leap press for fixing the leap cup to the holder body by pressing the leap cup from a direction orthogonal to an axis of the leap cup and is movably disposed in the holder body, biasing means for biasing the lens press shaft in a direction in which the leap press presses the leap cup, and a set screw which is threadably engaged with the holder body and releases the leap cup from a pressed state produced by the leap press by moving the lens press shaft in a direction opposite to a biasing direction of the biasing means.

According to the present invention, there is provided a holder comprising a spectacle frame shape measuring apparatus holder which holds a frame template used to measure a frame shape of a rimless spectacle frame shape, and a holder mount portion which mounts the holder, the holder including a holder body having a template mount portion, a set screw which extends through a central hole formed in the center of the frame template to fix the frame template to the template mount portion, and a fixing pin which fixes the set screw to the template mount portion, wherein the set screw has a male thread portion, the template mount portion has a mount hole in which the set screw is inserted, the set screw has a pin guide groove which is formed in a surface of the male thread portion in an axial direction, and the fixing pin has a distal end portion protruding into the screw mount hole from a direction orthogonal to an axis of the screw mount hole, is located in the pin guide groove when inserted into the screw mount hole, and engages with a thread groove of the male thread portion of the set screw to fix the set screw when the set screw is fastened.

According to the present invention, there is provided a holder comprising a spectacle frame shape measuring apparatus holder which holds a frame template used to measure a frame shape of a rimless spectacle frame shape, and a holder mount portion which mounts the holder, the holder including a holder body having a lens mount portion, and the lens mount portion including a cup shaft fixed in the holder body, a leap cup which is detachably fitted on the cup shaft and holds a lens, a lens press shaft which has a leap press for fixing the leap cup to the holder body by pressing the leap cup from a direction orthogonal to an axis of the leap cup and is movably disposed in the holder body, biasing means for biasing the lens press shaft in a direction in which the leap press presses the leap cup, and a set screw which is threadably engaged with the holder body and releases the leap cup from a pressed state produced by the leap press by moving the lens press shaft in a direction opposite to a biasing direction of the biasing means.

According to the present invention, there is provided a spectacle frame shape measuring apparatus which measures a shape of a frame groove of a spectacle frame, and an outer circumferential shape of a frame template or a lens, comprising a housing having a holder mount portion formed along one side edge of an opening portion which is open upward and in which the spectacle frame or the lens is inserted, a holder which holds the frame template or the lens, and an automatic discrimination mechanism which is mounted on the holder mount portion and automatically discriminates measurement modes for the frame template and the lens, wherein the holder includes a template mount portion having one surface on which a left or right frame template is mounted, and a lens mount portion having the other surface which is opposite to one surface and on which a left or right lens is mounted, the holder is turned over and mounted on the holder mount portion such that the frame template faces down when the frame template is to be measured, and the lens faces down when the lens is to be measured, the holder mount portion includes a first fixing portion on which the holder is fixed when the left frame template or lens is to be measured, and a second fixing portion on which the right frame template or lens is to be measured, and the automatic discrimination mechanism includes a first sensor which is disposed on the first fixing portion and detects that the holder is mounted, and a second sensor which is disposed on the second fixing portion and detects that the holder is mounted.

According to the present invention, there is provided a spectacle frame shape measuring apparatus which measures a shape of a frame groove of a spectacle frame, and an outer circumferential shape of a frame template or a lens, comprising a housing having a holder mount portion formed along one side edge of an opening portion which is open upward and in which the spectacle frame or the lens is inserted, a holder which holds the frame template or the lens, and an automatic discrimination mechanism which is mounted on the holder mount portion and automatically discriminates measurement modes for the frame template and the lens, wherein the holder includes a template mount portion having one surface on which a left or right frame template is mounted, and a lens mount portion having the other surface which is opposite to one surface and on which a left or right lens is mounted, the holder is turned over and mounted on the holder mount portion such that the frame template faces down when the frame template is to be measured, and the lens faces down when the lens is to be measured, the holder mount portion includes a first fixing portion on which the holder is fixed when the left frame template or lens is to be measured, and a second fixing portion on which the right frame template or lens is to be measured, and the automatic discrimination mechanism includes a first sensor which is disposed on the first fixing portion and detects that the left frame template is mounted, a second sensor which detects that the left lens is mounted, a third sensor which is disposed on the second fixing portion and detects that the right frame template is mounted, and a fourth sensor which detects that the right lens is mounted.

BRIEF DESCRIPTION OF THE DRAWINGS

FIGS. 9A and 9B are a perspective view of a pivot lever of an evacuating mechanism and an exploded perspective view of the pivot lever;

FIG. 28 is a view showing the states of the sensors;

FIGS. 32A, 32B, and 32C are views showing the distances between the vertex portion of a contact portion and frame grooves when opening angles α of the frame grooves are 110°, 100°, and 90°; and FIG. 33 is a view showing the difference between the positions of contact points.

DESCRIPTION OF THE PREFERRED EMBODIMENT

Figure 1:
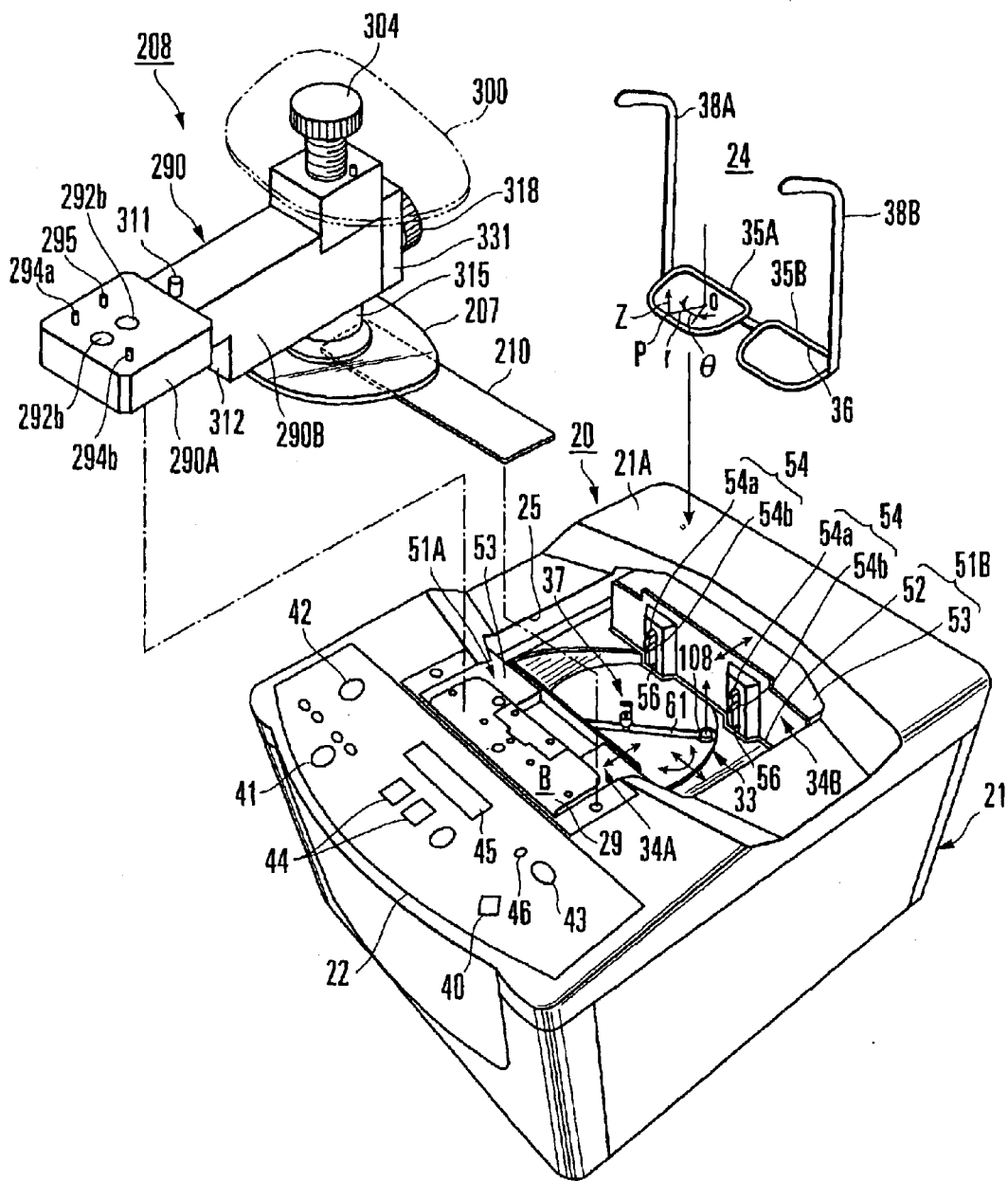
FIG. 1 is a partially developed perspective view showing the overall structure of a spectacle frame shape measuring apparatus according to the present invention.

The present invention will be described in detail below with reference to an embodiment shown in the accompanying drawings.

FIGS. 1 to 11 show an embodiment of the spectacle frame shape measuring apparatus according to the present invention.

Referring to FIGS. 1 to 11, a spectacle frame shape measuring apparatus denoted as a whole by reference numeral 20 has a box-like housing 21 in a substantially rectangular parallelepiped shape.

A switch panel 22 is mounted on the front end portion of an upper cover 21A forming the upper surface of the housing 21. An opening portion 25 is formed in the central portion of the housing 21. A spectacle frame 24 to be measured, a lens 207, or a frame template 300 is mounted in the housing from above through the opening portion 25. A metal fitting 29 having an L-shaped cross-section is mounted on the front edge side of the opening portion 25.

The metal fitting 29 forms a mount portion for a holder 208 used to measure the outer circumferential shape of the lens 207 or frame template 300 instead of the spectacle frame 24. The holder 208 is normally covered with a cover plate 210. When the frame template 300 or lens 207 is to be measured, the cover plate 210 is removed.

The following components and units are arranged in the central portion of the housing 21: a rotating table 33 which is rotatable in a horizontal plane and movable in a lateral direction, a pair of front and rear clamping units 34A and 34B (FIG. 2) which clamp the rotating table 33, oppose each other above the rotating table 33, and synchronously approach or separate, a measurement element 37 which moves along frame grooves 36 (FIGS. 3 and 12) formed in the inner circumferential portions of left and right rims (frame rims) 35A and 35B of the spectacle frame 24, a control section (not shown) which controls the overall apparatus, an r-axis measuring unit (not shown) which measures the three-dimensional movement of the measurement element 37, i.e., a displacement r in the radial direction, a θ-axis measuring unit (not shown) which measures a rotational angle θ of the measurement element 37 which rotates about an arbitrary point O within the rim 35A (35B) in a horizontal plane, a Z-axis measuring unit 100 which automatically measures a displacement Z in the vertical direction, and the like.

The switch panel 22 best shown in FIG. 1 has a start button 40, select button 41, reset button 42, data button 43, up/down button 44, LCD display unit 45, and the like. The start button 40 is used to start measuring the shape of the spectacle frame 24, lens 207, or frame template 300. When a data lamp 46 is green, measurement is permitted, whereas when the lamp is red, measurement is inhibited. The select button 41 is used to select a condition for shape measurement. In the case of the spectacle frame 24, shape measurement is performed in the order of both eyes, right eye, and left eye. In the case of the lens 207 and frame template 300, shape measurement starts from the right or left side.

When the reset button 42 is pressed during shape measurement, the measurement is stopped, and the measurement element 37 returns its home position. When this button is pressed at the home position, the home position is reset. When the button is pressed during a wait for data transfer, the data is cleared. When the data button 43 is pressed after shape measurement is completed and the data lamp 46 changes from green to red, the measurement data is automatically transferred to a finishing machine or management computer. After shape measurement, the data lamp 46 changes from green to red to indicate a ready state of data transfer. The up/down button 44 allows an operator to adjust, for example, the position of the measurement element 37 in a back and forth direction and the vertical direction in the manual mode. The LCD display unit 45 displays the automatic mode, the manual mode, error codes, and the like.

As best shown in FIG. 1, the spectacle frame 24 is a frame as a measurement target, which is loaded into the housing 21 through the opening portion 25 such that the rims 35A and 35B are located at a lower position and two temples 38A and 38B are located at an upper position, and the left and right rims 35A and 35B are clamped by the clamping units 34A and 34B, respectively.

The clamping units 34A and 34B best shown in FIG. 1 have almost the same structure, which have sliders 51A and 51B each constituted by a clamp base 52 which is movable in a back and forth direction and an upper case 53 covering the clamp base 52. Clamping means 54 are disposed in these sliders. The front slider 51A and rear slider 51B are coupled to each other through wires so as to move in opposite directions by the same distance. These sliders are normally held by constant force springs in a state wherein they are closest to each other. If, therefore, one of the sliders, e.g., the rear slider 51B, is held with a hand and moved backward in this state, the front slider 51A moves simultaneously forward by the same distance so as move away from the rear slider 51B. When the rear slider 51B is released after it is moved backward, the front and rear sliders 51A and 51B move in the direction to approach by the same distance owing to the force of the constant force springs, thus returning to their home positions.

Figure 2:
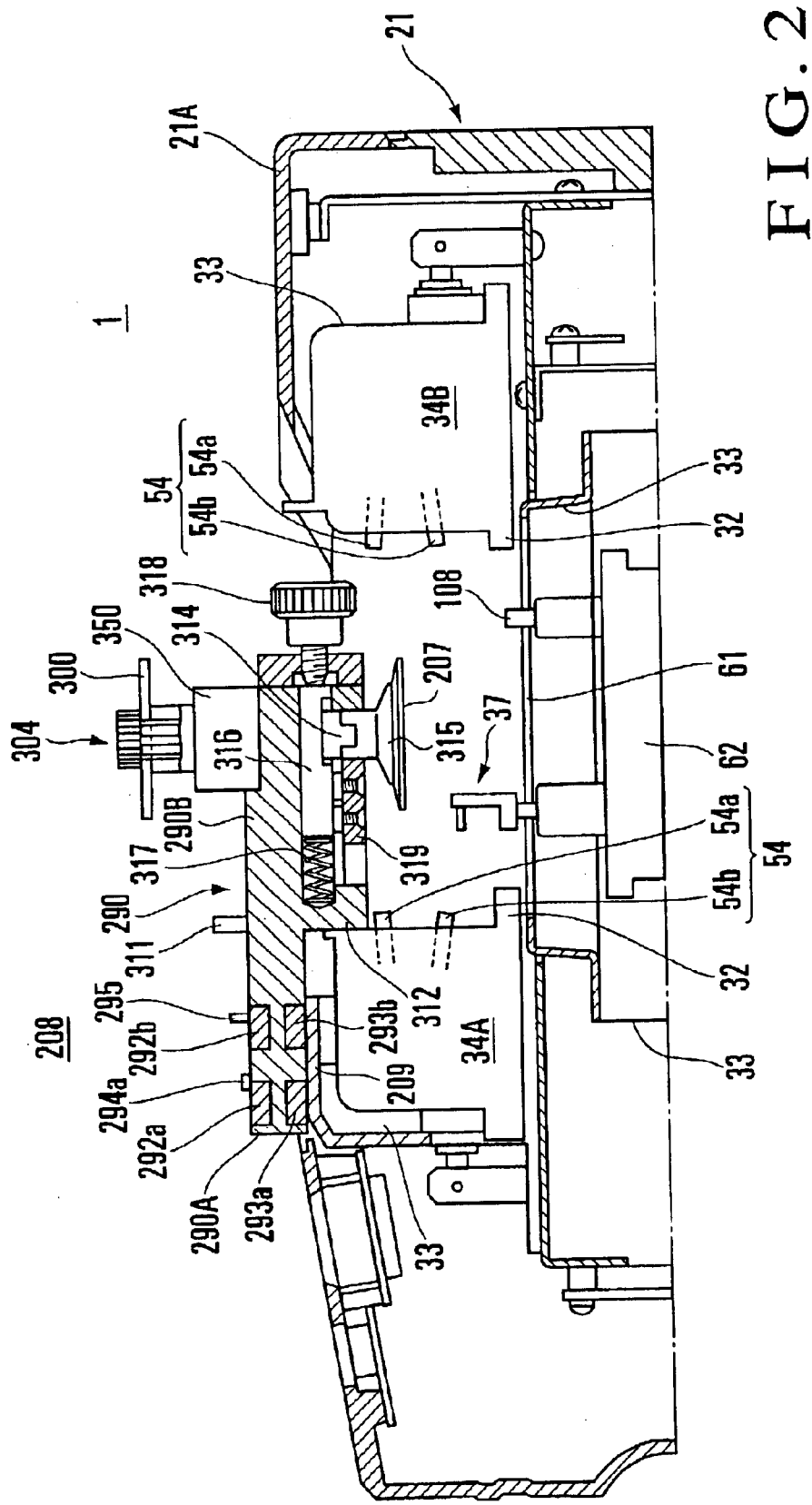
FIG. 2 is a sectional view of the main part of the spectacle frame shape measuring apparatus in FIG. 1.
Figure 3:
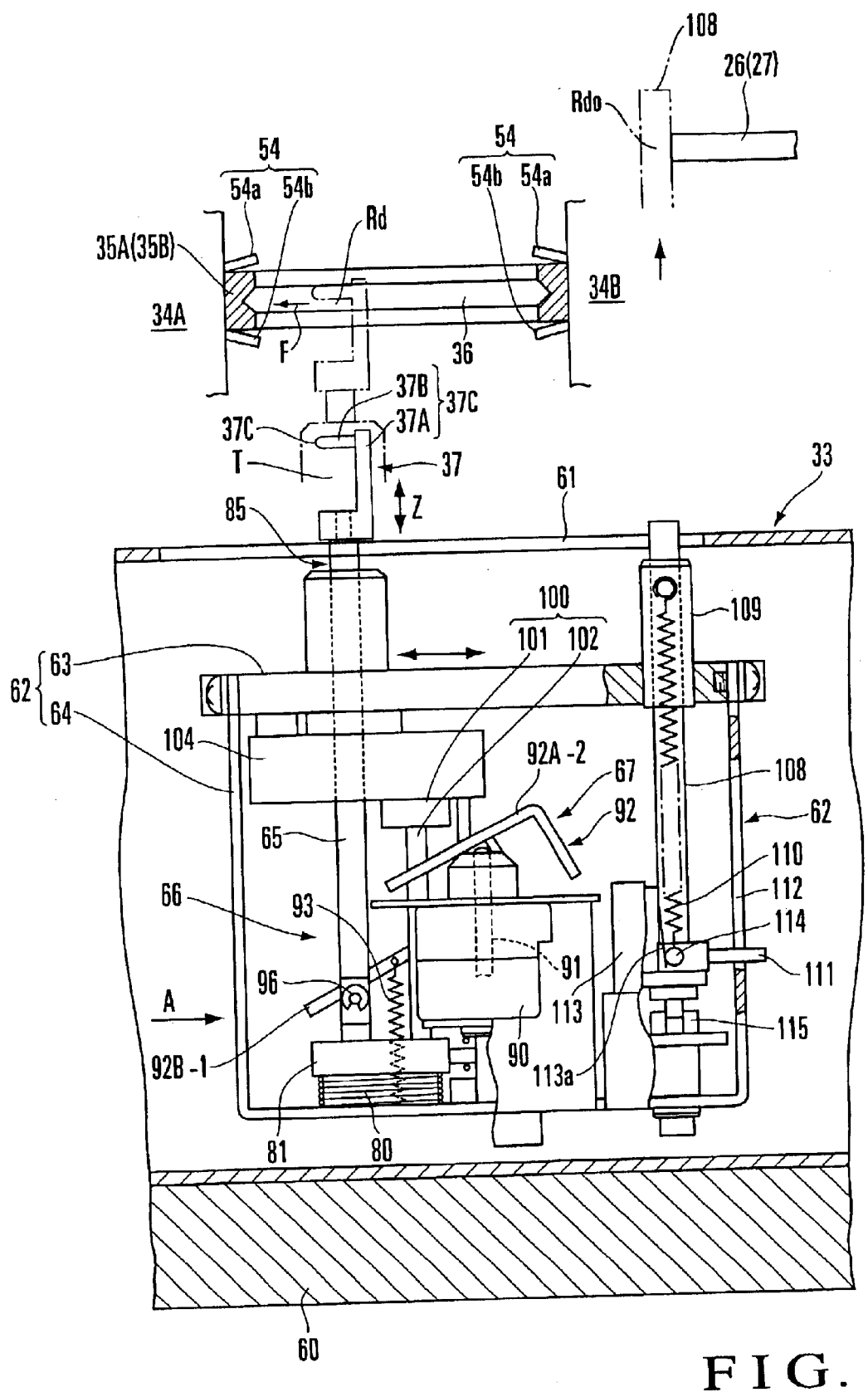
FIG. 3 is a sectional view of the main part to explain the operation of the Z-direction measurement element (ME) holding mechanism of the spectacle frame shape measuring apparatus.

As shown in FIGS. 2 and 3, the clamping means 54 is constituted by two clamp pins 54a and 54b which are so disposed as to oppose each other in the vertical direction and are synchronously operated by a cam mechanism (not shown) in the direction to approach and separate. A total of four clamping means 54 are arranged; the clamping means 54 are arranged in twos on the front and rear sides. The two clamping means 54 are disposed on each of the clamping units 34A and 34B. The distal end portions of the two clamp pins 54a and 54b constituting the clamping means 54 protrude outside from a long groove 56 formed in the upper case 53 to be elongated in the vertical direction. These pins are normally held in a state wherein they are open (spaced apart from each other).

When the spectacle frame 24 is to be mounted in the spectacle frame shape measuring apparatus 20, the pair of front and rear clamping units 34A and 34B are spaced apart from each other, and the spectacle frame 24 is inserted into the housing 21 through the opening portion 25. The rims 35A and 35B are then inserted between the upper and lower damp pins 54a and 54b of each clamping means 54 and are held at the resulting height. When the rear slider 51B is held with a hand and moved forward in this state, the front slider 51A simultaneously moves backward. The rims 35A and 35 B are clamped by these sliders 51A and 51B from forward and backward, and the upper and lower rim portions of the respective rims 5A and 35B are placed on the lower clamp pins 54b. When the start button 40 is pressed, the clamp pins 54a and 54b are moved close to each other by driving of a motor (not shown) to clamp the upper and lower rim portions of the respective rims 35A and 35B. When the clamp pins 54a and 54b are dosed to clamp the rims 35A and 35B, the sliders 51A and 51B are positioned to their clamping positions by stoppers (not shown), thereby completing the mounting of the spectacle frame 24 in the housing 21.

The rotating table 33 shown in FIGS. 1, 2, and 3 is rotatably mounted on a slide table 60 (FIG. 3) which can reciprocally move in a lateral direction. When the shape of the spectacle frame 24, lens 207, or frame template 300 is to be measured, the rotating table 33 is caused to make a little more than one revolution by a pulse motor (not shown). At this time, the rotational angle of the rotating table 33 (in fact, the number of pulses supplied to the motor) is detected as a displacement (θ) of the measurement element 37 in the rotational direction within a horizontal plane by the θ-axis measuring unit (not shown). A long groove 61 is formed in the upper surface of the rotating table 33 so as to extend through the center of the table in the radial direction in correspondence with the measurement element 37.

The slide table 60 is coupled to a DC motor (not shown) through a wire, and designed to move to the left side at the time of measurement of the shape of the rim 35A, lens 207, or frame template 300 on the left side, and to move to the right side at the time of measurement of the shape of the rim 35B, lens 207, and frame template 300 on the right side.

A slider 62 is disposed inside the rotating table 33. The slider 62 is constituted by an upper plate 63 and an upcurved U-shaped lower plate 64 fastened to the lower surface of the upper plate 63 with screws. The slider 62 incorporates a Z-direction measurement element (ME) holding mechanism 66 which holds the measurement element 37 to be vertically movable in an almost loadless state, and an evacuating mechanism 67 which evacuates the measurement element 37 to the lowermost position, i.e., an evacuation position T indicated by the solid lines in FIG. 3.

Figure 10:
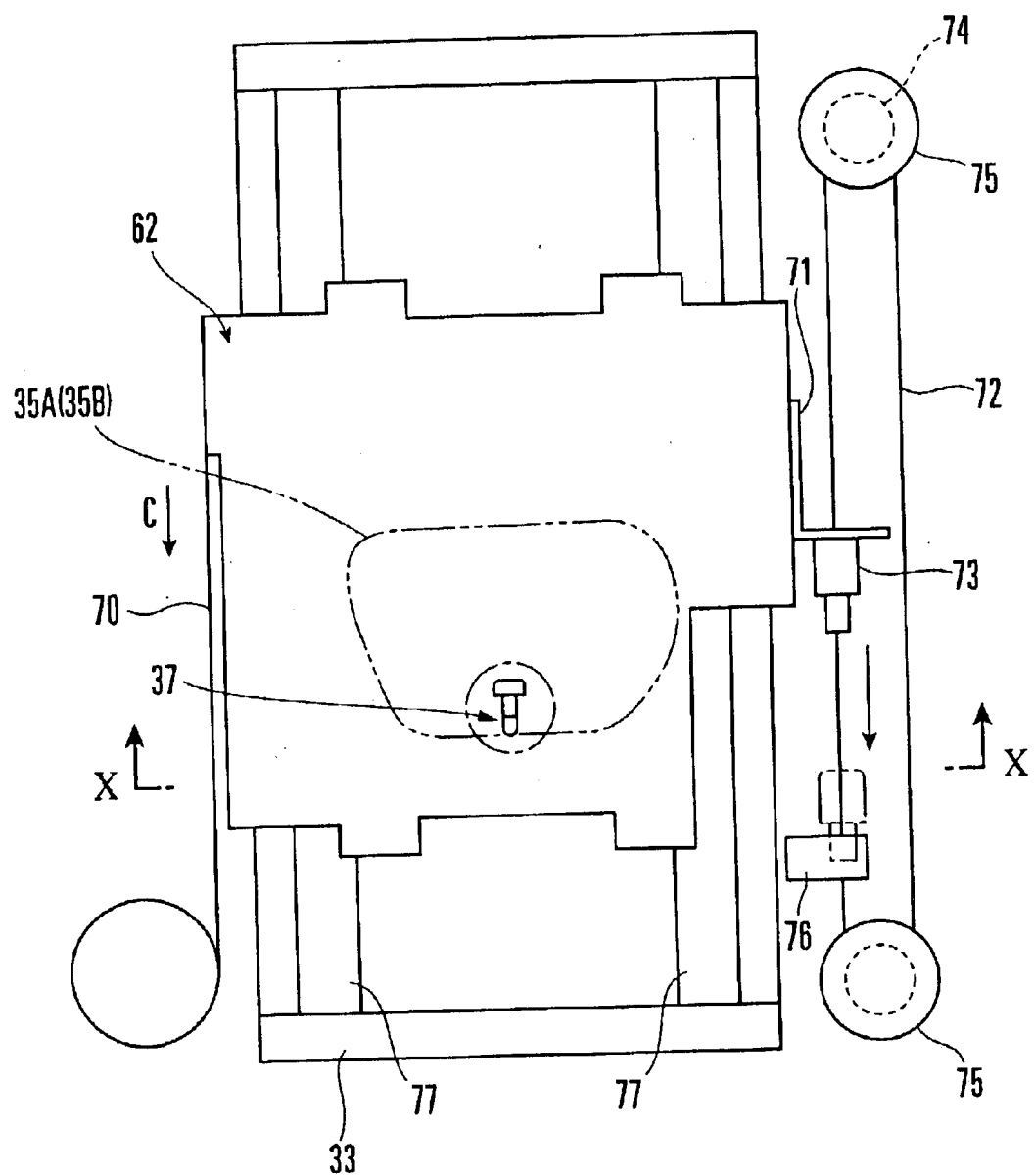
FIG. 10 is a schematic plan view showing the driving mechanism of the slider.
Figure 11:
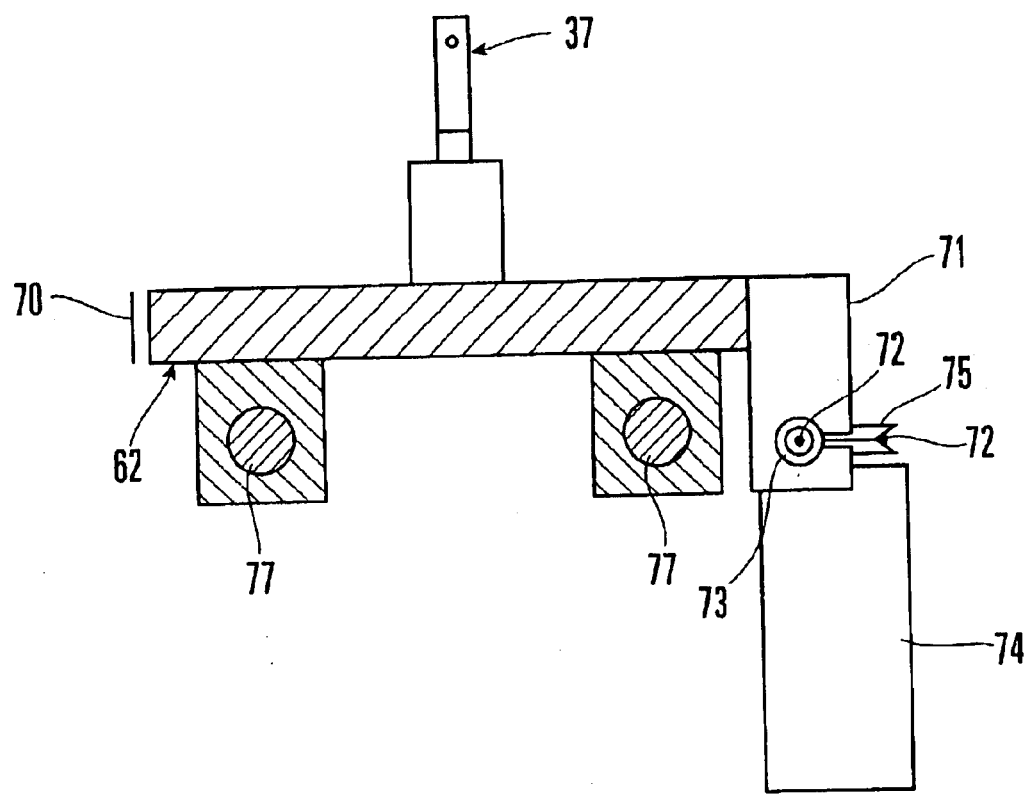
FIG. 11 is a sectional view taken along a line XI—XI in FIG. 10.

The slider 62 is so disposed as to be movable in the longitudinal direction of the long groove 61 in the rotating table 33, and is biased in one direction (the direction indicated by an arrow C) by a constant force spring 70, as shown in FIGS. 10 and 11. A slider fitting 71 is fixed to one side surface of the slider 62. The biasing force of the constant force spring 70 is also controlled by the movement of a motor-driven wire 72 disposed on a side surface of the slider 62. A stopper fitting 73 is fixed to the wire 72. This stopper fitting 73 is interlocked with the movement of the wire 72 and located at a front position in the moving direction of the slider fitting 71. In a normal state, therefore, wherein the slider 62 is biased by the constant force spring 70, the slider fitting 71 is in contact with the stopper fitting 73 of the wire 72 so that the movement of the slider 62 is restricted by the slider fitting 71 of the wire 72. The wire 72 stretched between two pulleys 75 moves as a motor 74 is driven. Along with this movement, the stopper fitting 73 also moves, and the slider 62 simultaneously moves. When the a contact portion 37C of the measurement element 37 comes into contact with the frame groove 36, the slider 62 stops at this position while receiving the biasing force of the constant force spring 70 (measurement start state).

Since the motor 74 shown in FIG. 10 is continuously rotating and the wire 72 is moving, the stopper fitting 73 singly moves away from the slider fitting 71. When this movement is sensed by a photosensor 76 disposed along the biasing direction, the motor 74 stops. The corresponding position becomes the evacuation position of the stopper fitting 73.

When measurement is completed, the stopper fitting 73 returns to its original position through a reverse process. Note that a displacement r of the slider 62 in the radial direction, i.e., the horizontal distance from an arbitrary point O in the rim 35A (35B) to a contact point P (FIG. 1) where the measurement element 37 comes into contact with the frame groove 36, is measured by an r-axis measuring unit (not shown) (see, for example, references 1 and 2 described above; frame tracer GT1000 available from HOYA CORP). Referring to FIGS. 10 and 11, reference numeral 77 denotes the slide shaft (guide rod) of the slider 62.

Figure 12:
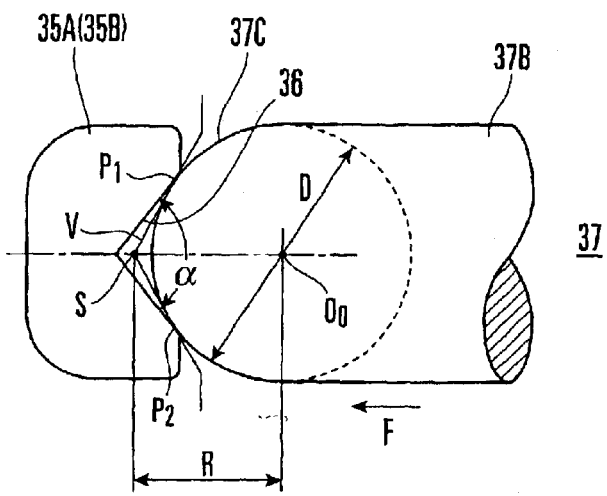
FIG. 12 is a view showing the contact portion of a measurement element and the frame groove of a rim.

Referring to FIG. 3, the measurement element 37 is mounted on the upper end of a rod 65 vertically extending through the long groove 61 of the rotating table 33 and a through hole formed in the upper plate 63, and hence is located above the rotating table 33. The measurement element 37 is constituted by an L-shaped main body 37A mounted on the upper end of the rod 65 as a component of the Z-direction ME holding mechanism 66 and an elongated pin 37B horizontally extending from the upper end portion of the main body 37A. The distal end portion of the pin 37B forms the contact portion 37C, which is sequentially inserted into the frame grooves 36 of the rims 35A and 35B and pressed against the groove walls with the predetermined measurement force F. As shown in FIG. 12, the contact portion 37C has a hemispherical shape with a diameter D set to 1.6 mm<D<2.2 mm.

The diameter D of the contact portion 37C is set to 1.6 mm<D<2.2 mm for the following reasons. Even with respect to frame grooves 36 having different opening angles α (FIG. 12) of 110°, 100°, and 90°, the contact portion 37C of the measurement element 37 does not come off the frame grooves 36, and measurement can be reliably performed. In addition, at all the opening angles α, 110°, 100°, and 90°, distances R from a bevel vertex S to a center $O_0$ of the contact portion 37C become approximately equal to each other when a 120° bevel V comes into contact with the frame groove 36. This setting makes it unnecessary to measure the opening angle α depending on the frame groove 36. In addition, this makes it possible to only correct a measurement value by adding a predetermined correction value to the measurement value regardless of the opening angle α.

Referring to FIG. 3, the Z-direction ME holding mechanism 66 is constituted by the rod 65 having the measurement element 37 mounted on the upper end and a balance spring 80 for pushing the rod 65 upward to hold the measurement element 37 in an almost loadless state. The rod 65 extends through the long groove 61 of the rotating table 33 and the through hole formed in the upper plate 63 to be vertically movable. A plate 81 is fixed to the lower end of the rod 65.

The rod 65 is biased upward by the balance spring 80. In the normal state, however, the rod 65 is pushed downward by the evacuating mechanism 67, as shown in FIG. 3, to evacuate the measurement element 37 to the evacuation position T. When shape measurement operation for the spectacle frame 24 is started, the rod 65 is released from the evacuating mechanism 67 and pushed upward to be held at the height position where the axis of the contact portion 37C of the measurement element 37 faces the frame groove 36 of the rim 35A (35B), i.e., the loading position Rd (see FIG. 3).

In this embodiment, the spring force of the balance spring 80 is set such that when a movable member 85 which is constituted by the measurement element 37, the rod 65, the plate 81, a pin 96 (to be described later), a sensor rod 102, and the like and can vertically move is moved upward by the biasing force of the balance spring 80 to move the measurement element 37 upward to the loading position Rd, a predetermined balance is kept between the weight of the movable member 85 and the biasing force of the balance spring 80. This makes it possible to perform shape measurement while holding the movable member 85 in an almost loadless state. In this case, the weight of the movable member 85 is preferably set to be equal to the spring force of the balance spring 80 to set a loadless state. In practice, however, the spring force of the balance spring 80 is set to be slightly larger than the weight of the movable member 85 in consideration of the precision and durability of the balance spring 80 (with string settings, an error in the precision of the spring itself cannot be absorbed, if any).

The evacuating mechanism 67 is constituted by a linear stepping actuator 90 which has a vertically movable screw rod 91, is fixed on the lower plate 64, and serves as a driving unit for releasing an evacuated state, a pivot lever 92 that is pivoted by the linear stepping actuator 90, a biasing spring 93 formed from a helical extension spring which biases the pivot lever 92 counterclockwise in FIG. 3, and the like. The upper and lower ends of this biasing spring 93 are respectively connected to the pivot lever 92 and the horizontal bottom plate portion of the lower plate 64.

As shown in FIGS. 9A and 9B, the pivot lever 92 is constituted by two lever members 92A and 92B which are formed by bending metal plates and integrally coupled to each other with screws (not shown). One lever member 92A is constituted by an lever body 92A-1 which has an inverted L shape in side view and is constituted by a horizontal plate portion 92A-1a and vertical plate portion 92A-1b, an abutment piece 92A-2 which extends from one side edge of the horizontal plate portion 92A-1a and against which the screw rod 91 can abut, and a fixed piece 92A-3 extending vertically downward from the lower surface of the horizontal plate portion 92A-1a. Two threaded holes 92C are formed in the fixed piece 92A-3.

The other lever member 92B is constituted by a plate-like main body 92B-1 which has a width that decreases stepwise toward the distal end and can abut, from above, against the pin 96 vertically extending from a portion near the lower end portion of the rod 65, a fixed piece 92B-2 extending vertically downward from the rear edge of the proximal end portion of the main body 92B-1, and a pair of left and right bent pieces 92B-3 extending vertically downward from the two side edges of the proximal end portion of the main body 92B-1. The fixed piece 92B-2 has two screw mount holes 92D, and is fixed to the fixed piece 92A-3 by screwing set screws extending through these screw mount holes 92D into the threaded holes 92C. The pair of bent pieces 92B-3 respectively have through holes 92E.

This pivot lever 92 is axially supported by a shaft 95 extending through the through holes 92E of the pair of bent pieces 92B-3 so as to be vertically pivotal. As shown in FIG. 2, when no measurement is made, the main body 92B-1 is brought into tight contact with the pin 96 from above by the spring force of the biasing spring 93 to push the rod 65 downward against the biasing force of the balance spring 80 and evacuate the measurement element 37 to the evacuation position T. At this time, the screw rod 91 has moved downward to the home position. The biasing spring 93 is formed from a helical extension spring, and its upper and lower ends are respectively connected to the pivot lever 92 and the horizontal bottom plate portion of the lower plate 64. The spring force of the biasing spring 93 is set to be larger than that of the balance spring 80.

An origin sensor 97 (FIG. 3) for detecting the screw rod 91 is disposed below the actuator 90. This origin sensor 97 is turned on and off by the screw rod 91. When the screw rod 91 is at the home position, the origin sensor 97 is kept on. When the screw rod 91 is moved upward by driving of the actuator 90, the origin sensor 97 is switched off.

Figure 4:
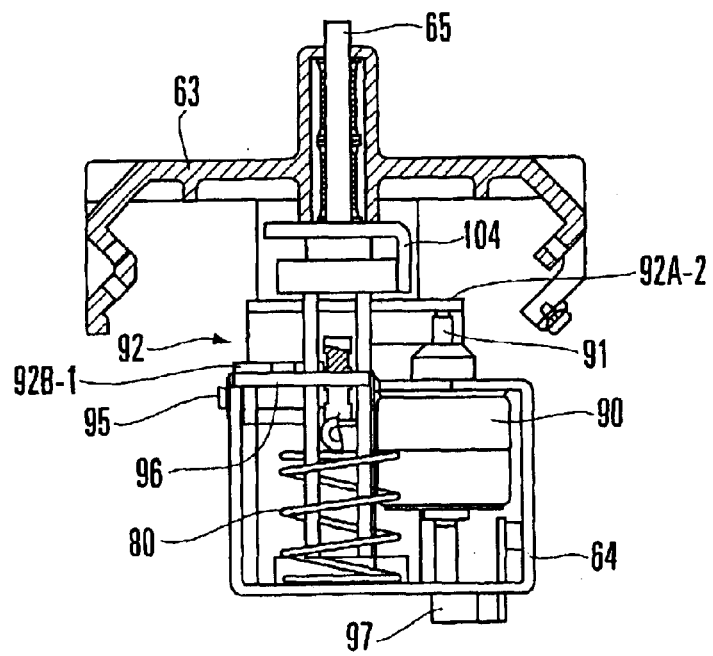
FIG. 4 is a sectional view of the Z-direction ME holding mechanism when viewed from the direction indicated by an arrow A in FIG. 3 at the time of loading into a frame groove.
Figure 5:
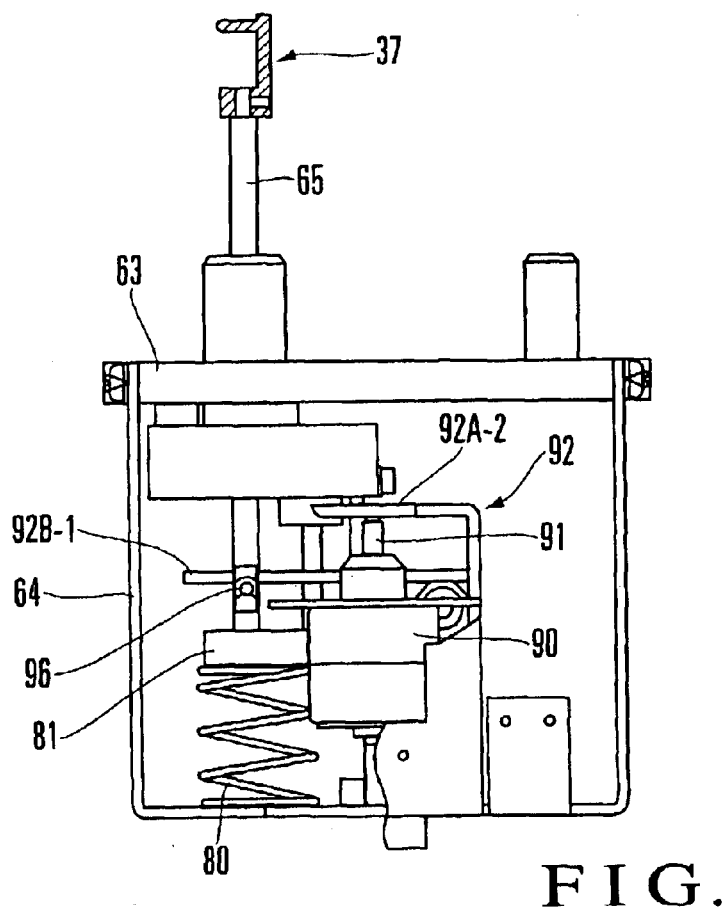
FIG. 5 is a side view at the time of loading.
Figure 6:
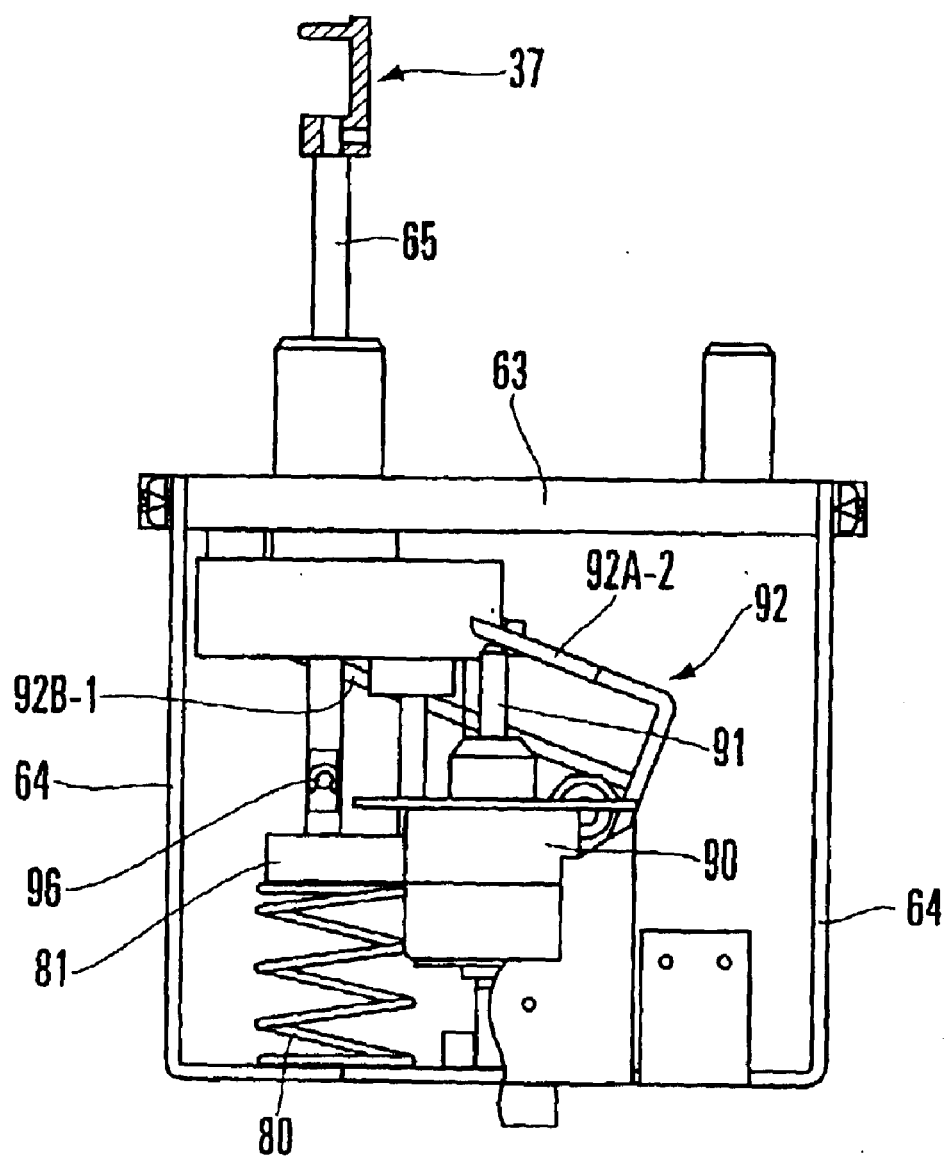
FIG. 6 is a side view at the time of shape measurement.
Figure 7:
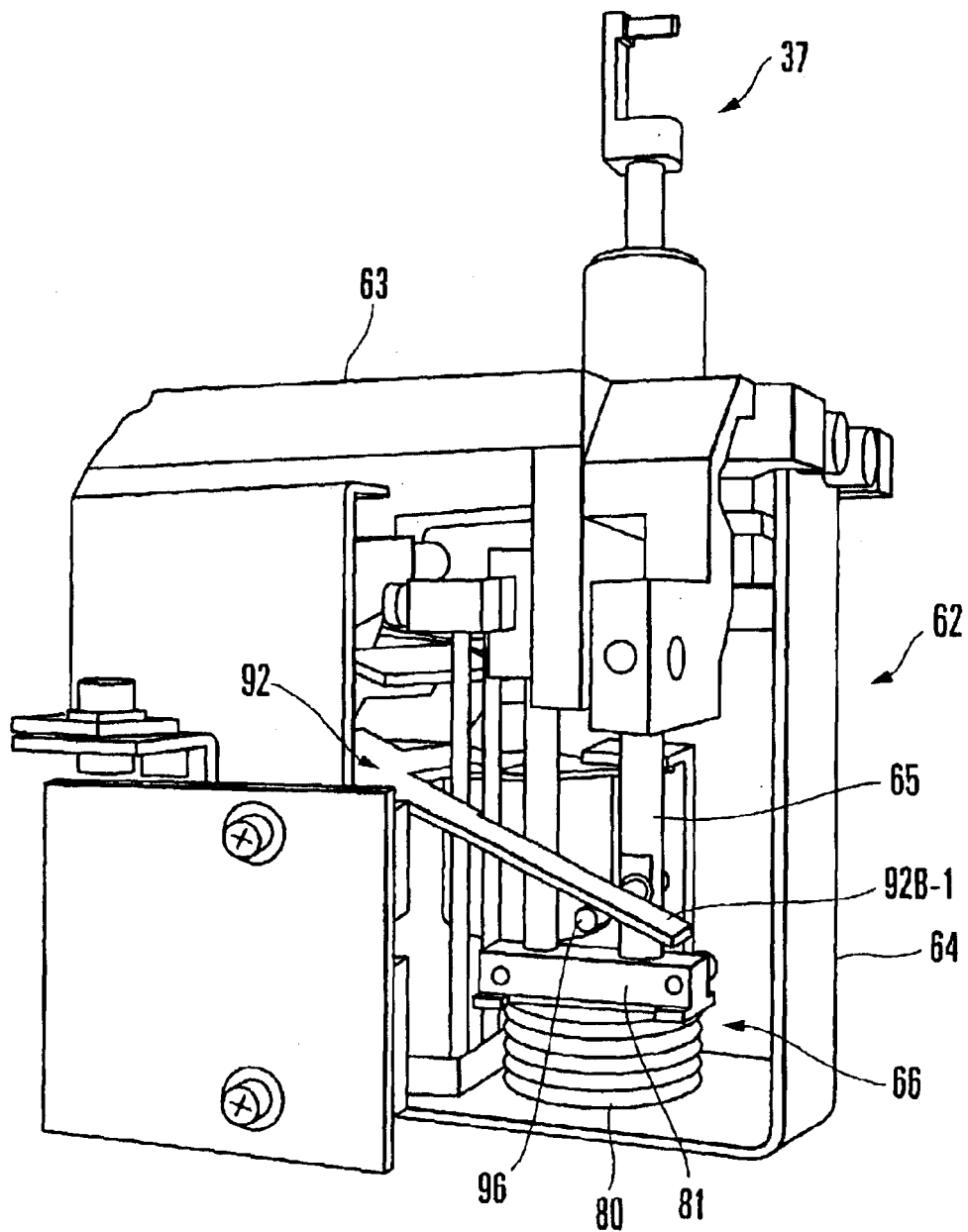
FIG. 7 is a perspective view of a slider when viewed from its front side.
Figure 8:
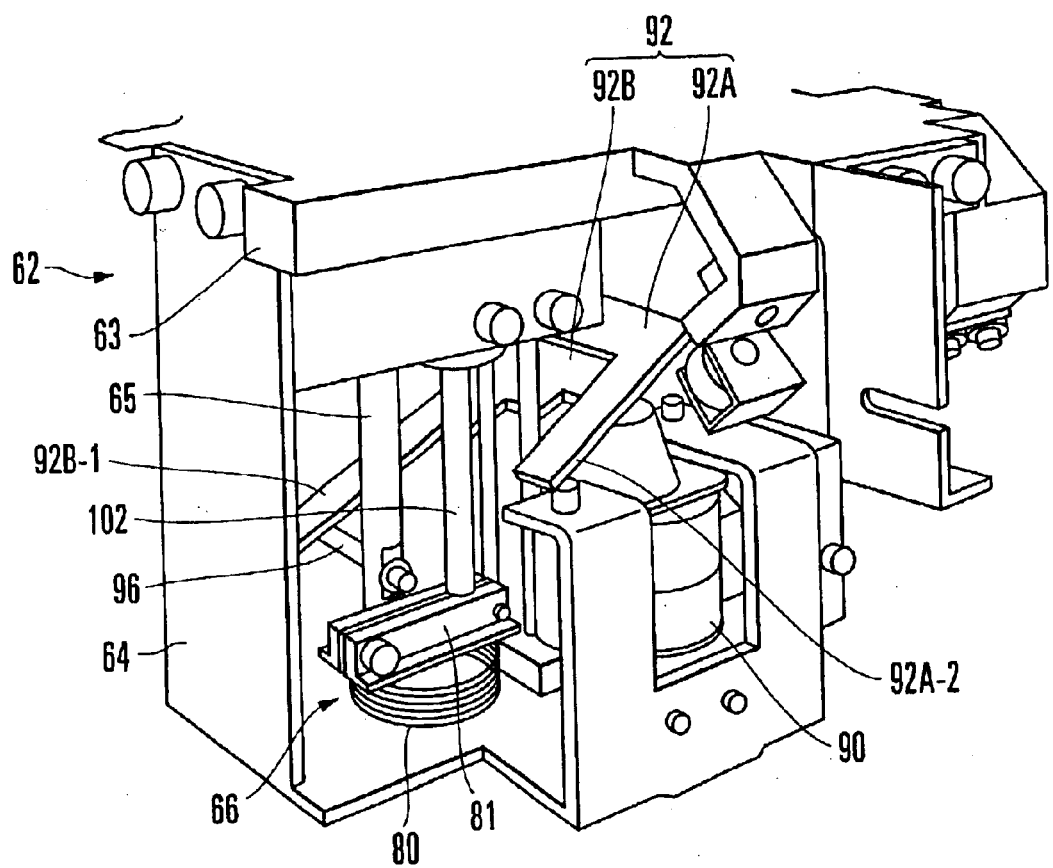
FIG. 8 is a perspective view of the slider when viewed obliquely from its front side.

At the time of shape measurement for the spectacle frame 24, when the screw rod 91 is rotated and raised by energizing the actuator 90, the abutment piece 92A-2 is pushed upward by the screw rod 91 against the tension of the biasing spring 93, and the pivot lever 92 pivots clockwise to be set in a substantially horizontal state. In this state, the actuator 90 temporarily stops and is held at the resulting height position by the screw rod 91. FIGS. 4 and 5 show this state. That is, when the pivot lever 92 pivots clockwise, the main body 92B-1 also pivots in the same direction. As a consequence, the rod 65 is gradually raised by the biasing force of the balance spring (helical compression spring) 80. When the abutment piece 92A-2 moves to a predetermined height position, the actuator 90 stops, and the measurement element 37 moves from the evacuation position T to the loading position Rd. The loading position Rd is also the central position of the frame groove 36. While the measurement element 37 is inserted in the frame groove 36, the screw rod 91 further moves upward, and the abutment piece 92A-2 pivots to the evacuation position in an oblique upward direction. The measurement element 37 then becomes free from vertical driving of the pivot lever 92, and measurement is started (see FIG. 6).

While the rod 65 is released from the pivot lever 92 and stops above the pivot lever 92, the pin 96 is located below the main body 92B-1 at a sufficient distance, thereby allowing the rod 65 to vertically move. That is, the rod 65 is completely spaced apart from the pivot lever 92 at the time of shape measurement, and is kept vertically movable to allow measurement of the displacement Z in the vertical direction.

The position where the weight of the movable member 85 keeps balancing with the biasing force of the balance spring 80 is higher than the loading position Rd of the measurement element 37 (which coincides with the center of the frame groove 36) by about 1 to 5 mm. The displacement z of the measurement element 37 in the height direction at the time of measurement is about ±10 mm.

In this embodiment, the height position where the above balance is kept is not perfectly matched with the position of the frame groove 36 in consideration of changes in quality of components including the balance spring 80 over time, assembly errors, and the like. Slightly pressing the balance spring 80 leaves room for positional adjustment. Ideally, it is preferable to impose no load in the Z-axis direction when the contact portion 37C of the measurement element 37 engages with the frame grooves 36 of the rims 35A and 35B. When the spring is stretched to the limit, it is difficult from a structural viewpoint to make further positional adjustment upward from the position. In contrast, while the spring is pressed, the above positional adjustment can be easily made.

In this manner, in switching from a measurement state to a non-measurement state, the rod 65 is forcibly lowered by the evacuating mechanism 67, and the measurement element 37 is evacuated from the loading position Rd to the evacuation position T. This prevents the rod 65 from stopping due to friction and the like in the process of movement, and makes it possible to reliably evacuate the measurement element 37 to the evacuation position T.

When shape measurement for the rim is completed, the actuator 90 is driven to lower the screw rod 91. As a consequence, the pivot lever 92 pivots counterclockwise against the tension of the biasing spring 93, and main body 92B-1 presses the pin 96 to forcibly lower the rod 65, thereby evacuating the measurement element 37 from the loading position Rd.

The horizontal plate 81 is fixed to the lower end of the rod 65, and the compression spring 80 is disposed between the plate 81 and the plate 64 described above. The Z-axis measuring unit (γ-axis measuring means) 100 for measuring the displacement Z of the measurement element 37 in the vertical direction is mounted on the upper surface of the plate 81. This Z-axis measuring unit 100 is formed from a conventionally known linear measuring unit and constituted by a ring-like sensor head 101 mounted on the lower surface of the upper plate 63 through an L-shaped fitting 104, and the sensor rod 102 serving as a magnetic scale (magnetic sensor) which extends through the sensor head 101 in a noncontact state so as to be vertically movable.

In other words, the Z-axis measuring unit 100 has the sensor rod 102 which is adjacent to the rod described above and disposed parallel to the rod 65, and the sensor head 101 adjacent to the sensor rod 102. The sensor rod extends through the ring-like sensor head 101 fixed to the slider 62 and is interlocked with the rod 65.

The sensor head 101 is constituted by nine flat coils arranged in the axial direction. Of these coils, the five odd-numbered (1, 3, 5, 7, 9) coils constitute a primary exciting coil, and the four even-numbered (2, 4, 6, 8) coils constitute a secondary exciting coil. The sensor rod (magnetic scale) 102 is formed by alternately arranging magnetic and nonmagnetic balls in a cylindrical member made of a nonmagnetic material such as SUS303. The sensor rod 102 extends vertically upward from the plate 81 described above so as to be located on a side of the rod 65. When the sensor rod 102 displaces vertically together with the rod 65, an induced voltage is generated in the induction coils of the sensor head 101. By detecting this induced voltage and performing signal processing for the voltage, the displacement of the sensor rod 102 in the vertical direction is detected as the displacement Z of the measurement element 37 in the vertical direction. The balance spring 80 is disposed between the lower surface of the plate 81 and the lower plate 64.

The use of the Z-axis measuring unit 100 having this structure eliminates the necessity to ensure a space for the Z-axis measuring unit 100 below the rod 65 on which the measurement element 37 is mounted because the Z-axis measuring unit 100 is constituted by the ring-like sensor head 101 extending vertically upward from the plate 81 and the sensor rod 102 extending through the sensor head 101. This makes it possible to decrease the height of the spectacle frame shape measuring apparatus 20 and hence realize a compact structure.

In addition, the Z-axis measuring unit 100 can be easily mounted because it is only required to mount it in a side space which is located inside the slider 62 and surrounds the rod 65 so as not to interfere with the evacuating mechanism 67.

The measurement rod 108 is also disposed in the slider 62. This measurement rod 108 is used as a measurement element in measuring the outer circumferential shape of the lens 207 or frame template 300. The measurement rod 108 extends through a cylindrical member 109 mounted on the upper plate 63 so as to be vertically movable, and the upper end of the measurement rod 108 is located near one end portion immediately below the long groove 61 of the rotating table 33. The measurement rod 108 is biased upward by a helical extension spring 110, and prevented from rotating by a rotation prevention pin 111. The rotation prevention pin 111 extends from the circumferential surface of the lower end portion of the measurement rod 108. The distal end portion of rotation prevention pin 111 is slidably inserted into a slit 112 which is formed in a vertical plate portion of the lower plate 64 so as to be elongated in the vertical direction.

The measurement rod 108 has a pin-like operation member 114 which turns on and off a limit switch 113, and is normally held at the lowermost position by a push latch 115. When the push latch 115 is operated once, it holds the measurement rod 108. When the push latch 115 is operated twice, it releases the held state to make a shift to a measurement state. As the push latch 115, a commercial available push latch is used. The limit switch 113 detects the used or unused state of the measurement rod 108. When the measurement rod 108 moves downward to the lowermost position, and its state is held by the push latch 115, a movable piece 113a is pushed and pivoted by the operation member 114, and the limit switch 113 is held in the OFF state. When the measurement rod 108 moves upward and the pressed state of the movable piece 113a due to the operation member 114 is released, the limit switch 113 is switched on. When the measurement rod 108 is pushed downward, since the held state of the measurement rod 108 due to the push latch 115 is released, the measurement rod 108 is pulled upward by the helical extension spring 110 to move to a loading position Rdo where it can contact the lens 207 or frame template 300. In this case, unlike shape measurement for the rims 35A and 35B, shape measurement for the lens 207 or frame template 300 is two-dimensional measurement, i.e., measurement of the displacement r in the radial direction and the rotational angle θ. For this reason, the measurement rod 108 need not be held in a floating state, and hence measurement may be done while the rotation prevention pin 111 is in tight contact with the upper end wall of the slit 112.

The limit switch 113 detects the used or unused state of the measurement rod 108. When the measurement rod 108 moves downward to the lowermost position, and its state is held by the push latch 115, a movable piece 113a is pushed and pivoted by the operation member 114, and the limit switch 113 is held in the OFF state. When the measurement rod 108 moves upward and the pressed state of the movable piece 113a due to the operation member 114 is released, the limit switch 113 is switched on.

The present inventor have made attempts to find the optimal diameter of the contact portion. For example, the present inventor have conducted experiments by changing the opening angle α of the frame groove and the diameter D of the contact portion of the measurement element. It was found after such trial and error that when the diameter D is set in a predetermined range, and more specifically, 1.6 mm<D<2.2 mm, the contact portion does not easily come off the frame groove 36, and there is no need to use different correction values for different opening angles α of the frame groove 36, allowing common use of one correction value.

This finding will be described with reference to FIGS. 15 to 18. According to this embodiment of the present invention, there is provided a spectacle frame shape measuring apparatus in which the contact portion of a measurement element is formed into a hemispherical shape, and the diameter D is set to a value in a predetermined range to prevent the measurement element from coming off frame grooves with different opening angles α, thereby allowing reliable measurement, and to correct measurement values by using the same correction value regardless of the opening angle α.

Referring to FIG. 12, the frame grooves 36 of the rims 35A and 35B are generally formed into V-shaped grooves with opening angles α of 110°, 100°, and 90°. In addition, the angle of a bevel grinding wheel is standardized to 120° and hence is always constant. Bevel lenses with an angle of 120° are fitted in spectacle frames having frame grooves 36 with any opening angles 12α. On the other hand, the contact portion 37C of the measurement element 37 is formed into a convex hemispherical shape, and the diameter D is set to be larger than 1.6 mm and smaller than 2.2 mm (1.6 mm<D<2.2 mm) regardless of the opening angle α. Assume that the diameter D is set within the range of 1.6 mm<D<2.2 mm in this manner. If the diameter D remains the same, the distances R from the bevel vertex S to the center $O_0$ of the contact portion 37C become approximately equal to each other when the 120° bevel V (V-shaped projection) of the contact portion 37C comes into contact with the frame groove 36. This makes it unnecessary to change a correction value to be added to measurement data depending on the opening angle α, thus allowing correction with the same correction value. If the diameter D is equal to or smaller than 1.6 mm, the differences between the distances R increase undesirably. If the diameter is equal to or larger than 2.2 mm, the differences between the distances R decrease, but the distances from the deepest portion of the frame groove 36 to contact points $P_1$ and $P_2$ of the contact portion 37C increase. This undesirably makes it easier for the measurement element 37 to come off the frame groove 36.

FIGS. 13A to 18C show the distances R when the opening angles α of the frame grooves 36 are respectively set to 110°, 100°, and 90°, and the diameters D of the contact portions 37C are respectively set to 1.6 mm, 1.8 mm, 2.0 mm, 2.1 mm, 2.2 mm, and 2.4 mm.

Figures 13A, 13B, 13C:
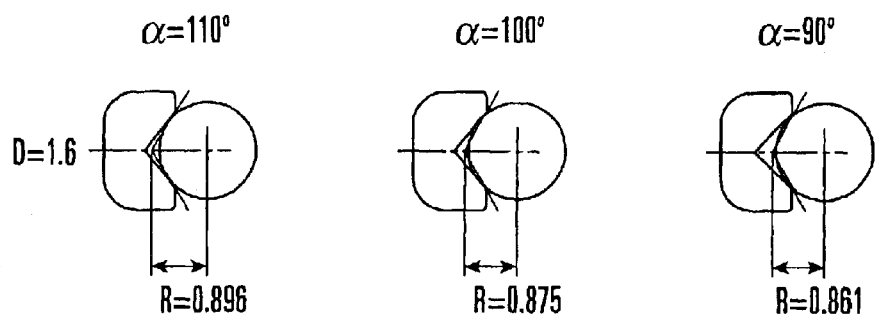
FIGS. 13A, 13B, and 13C are views showing distances R when opening angles α of frame grooves are 110°, 100°, and 90°, and a diameter D of the contact portion is set to 1.6 mm.
Figures 14A, 14B, 14C:
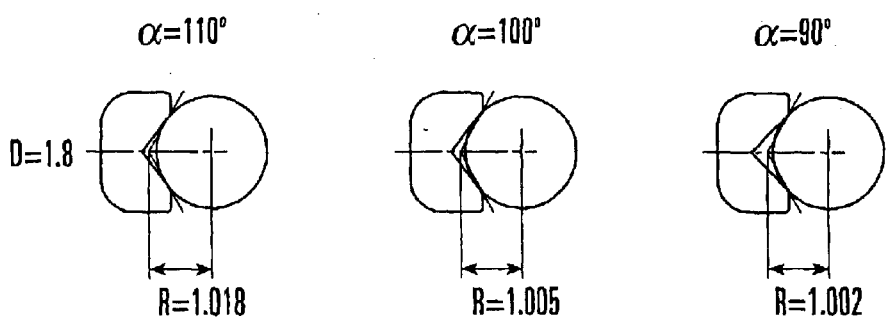
FIGS. 14A, 14B, and 14C are views showing distances R when the opening angles α of frame grooves are 110°, 100°, and 90°, and the diameter D of the contact portion is set to 1.8 mm.

As shown in FIGS. 13A to 13C, when the diameter D is set to 1.6 mm, R=0.896 mm in the case of α=110° shown in FIG. 13A; R=0.875 mm in the case of α=100° shown in FIG. 13B; and R=0.861 mm in the case of α=90° shown in FIG. 13C. The difference between the distance with α=110° and that with α=90° is 0.035 mm (0.896–0.861). In consideration of the meaning of this difference, 0.035 mm, the perimeter of the frame groove 36 can be regarded as one criterion.

In general, as the difference between the perimeter of the frame groove 36 of each of the rims 35A and 35B and the perimeter of the bevel V formed in the outer circumference of a lens by a bevel process exceeds 0.2 mm, the fit state between the lens 207 and the frame groove 36 deteriorates. Assume that the frame shape of the spectacle frame 24 is regarded as a circle. In this case, if the above difference in the radial direction becomes 0.35 mm, this error in the frame as a whole increases by about six times (2π=2×3.14) to become about 0.21 mm, which exceeds the above allowable error, 0.2 mm.

Consider an allowable diameter error near 0.2 mm. When the diameter D is set to 1.6 mm, as shown in FIGS. 13A to 13C, R=1.018 mm in the case of α=110° shown in FIG. 14A; R=1.005 mm in the case of α=100° shown in FIG. 14B; and R=1.002 mm in the case of α=90° shown in FIG. 14C. The difference between the distance with α=110° and that with α=90° is 0.016 mm. The error in the frame as a whole becomes 0.096 mm (2π×0.016), which is sufficiently smaller than the above allowable error, 0.2 mm.

Figures 15A, 15B, 15C:
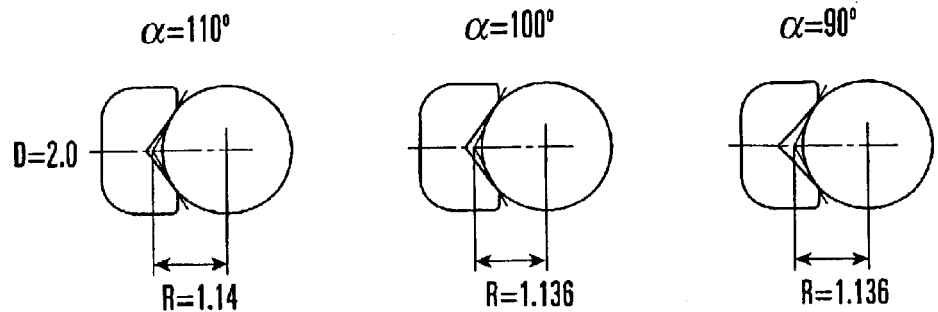
FIGS. 15A, 15B, and 15C are views showing distances R when the opening angles α of frame grooves are 110°, 100°, and 90°, and the diameter D of the contact portion is set to 2.0 mm.

When the diameter D is set to 2.0 mm, as shown in FIGS. 15A to 15C, R=1.14 mm in the case of α=110° shown in FIG. 15A; R=1.136 mm in the case of α=100° shown in FIG. 15B; and R=1.136 mm in the case of α=90° shown in FIG. 15C. The difference between the distance with α=110° and that with α=90° is 0.004 mm. The error in the frame as a whole becomes 0.024 mm, which is sufficiently smaller than the above allowable error, 0.2 mm.

Figures 16A, 16B, 16C:
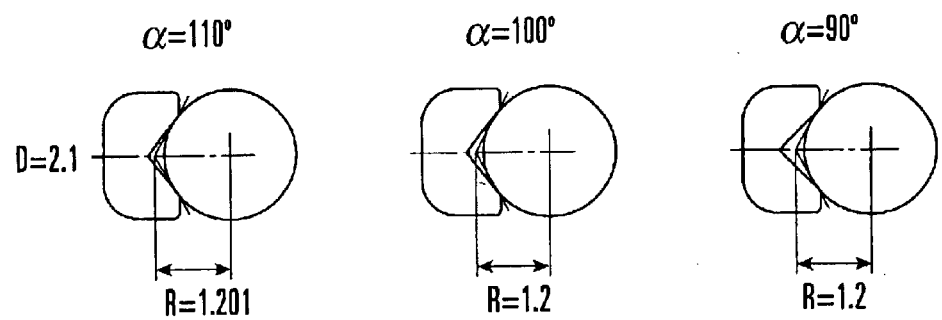
FIGS. 16A, 16B, and 16C are views showing distances R when the opening angles α of frame grooves are 110°, 100°, and 90°, and the diameter D of the contact portion is set to 2.1 mm.

When the diameter D is set to 2.1 mm, as shown in FIGS. 16A to 16C, R=1.201 mm in the case of α=110° shown in FIG. 16A; R=1.2 mm in the case of α=100° shown in FIG. 16B; and R=1.2 mm in the case of α=90° shown in FIG. 16C. The difference between the distance with α=110° and that with α=90° is 0.001 mm. The error in the frame as a whole becomes 0.006 mm (2π×0.001), which is sufficiently smaller than the above allowable error, 0.2 mm.

Figures 17A, 17B, 17C:
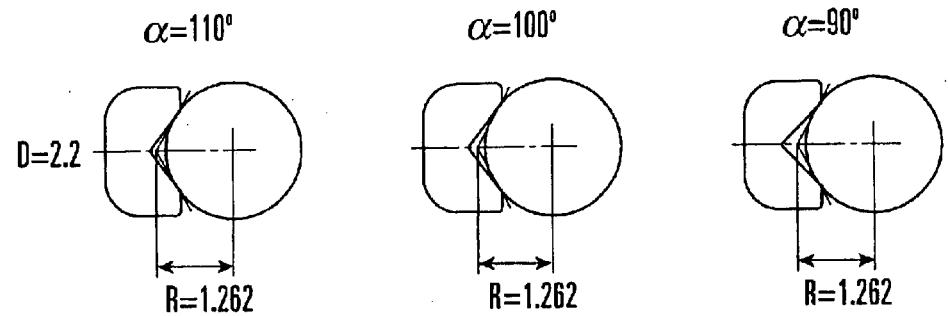
FIGS. 17A, 17B, and 17C are views showing distances R when the opening angles α of frame grooves are 110°, 100°, and 90°, and the diameter D of the contact portion is set to 2.2 mm.

When the diameter D is set to 2.2 mm, as shown in FIGS. 17A to 17C, R=1.262 mm in the case of α=110° shown in FIG. 17A; R=1.262 mm in the case of α=100° shown in FIG. 17B; and R=1.262 mm in the case of α=90° shown in FIG. 17C. The difference between the distance with α=110° and that with α=90° becomes zero.

On the other hand, as the diameter D of the contact portion 37C increases as shown in FIGS. 17A to 17C, the contact points with the frame groove 36 move outside. This undesirably makes it easier for the contact portion 37C to come off the frame groove 36.

Figures 18A, 18B, 18C:
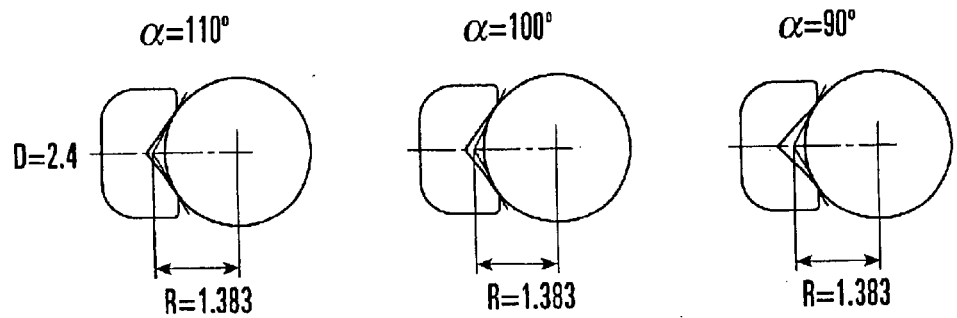
FIGS. 18A, 18B, and 18C are views showing distances R when the opening angles α of frame grooves are 110°, 100°, and 90°, and the diameter D of the contact portion is set to 2.4 mm.

When the diameter D is set to 2.4 mm, as shown in FIGS. 18A to 18C, R=1.383 mm in the case of α=110° shown in FIG. 18A; R=1.383 mm in the case of α=100° shown in FIG. 18B; and R=1.262 mm in the case of α=90° shown in FIG. 18C. The difference between the distance with α=110° and that with α=90° becomes zero. However, the contact portion 37C undesirably easily comes off the frame groove 36.

The diameter D of the contact portion 37C is therefore set to 1.6 mm or more and limited to a value near 2.1 mm at maximum.

Figure 29:
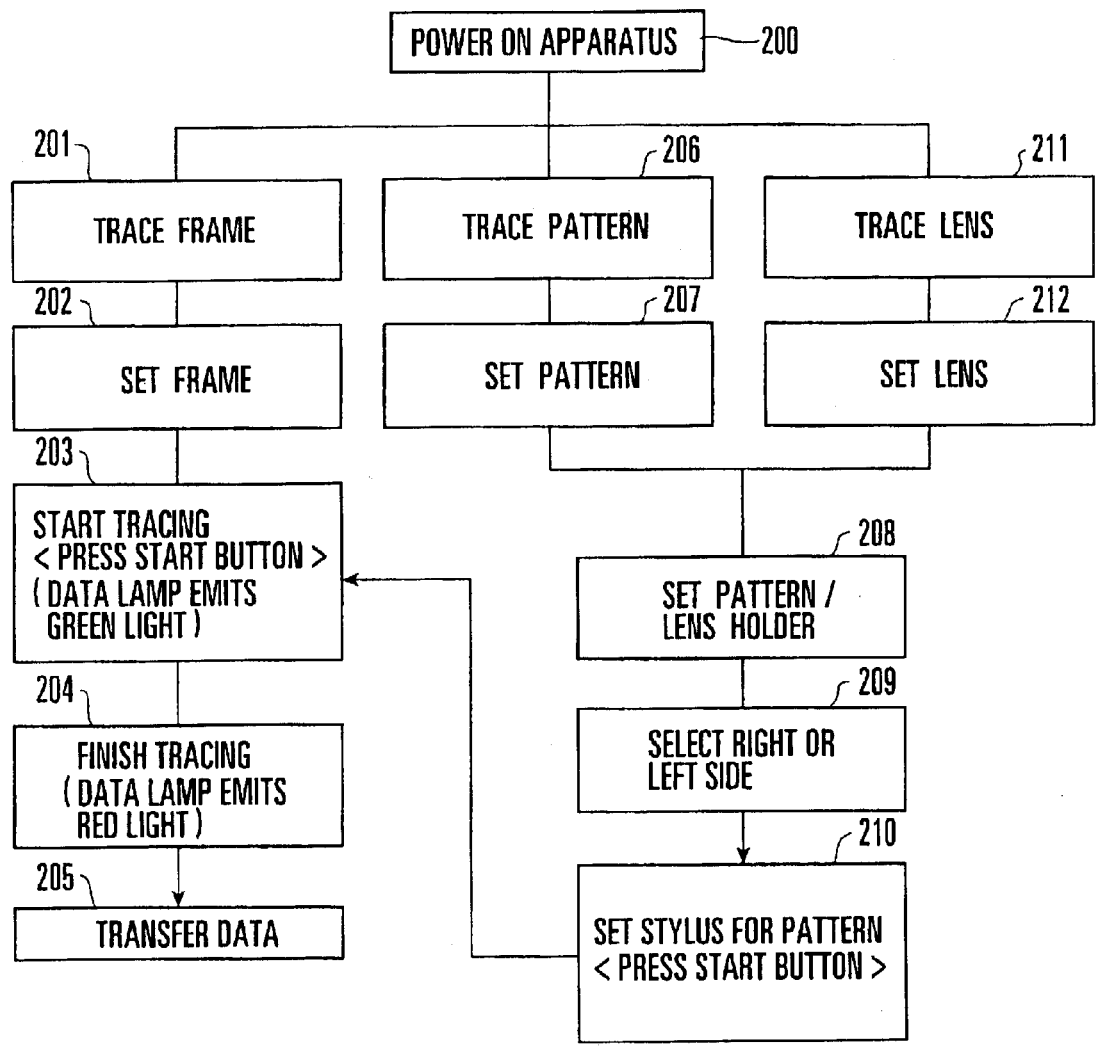
FIG. 29 is a flow chart showing an operation procedure.

The operation procedure of the spectacle frame shape measuring apparatus 20 having the above structure will be described next with reference to the flow chart of FIG. 29.

First of all, the apparatus is powered on (step 200).

When shape measurement (frame tracing) for the rims 35A and 35B is to be performed (step 201), the spectacle frame 24 is inserted into the housing 21 through the opening portion 25, and the rims 35A and 35B are respectively clamped by the pair of clamping units 34A and 34B.

A condition for shape measurement is then set by using the select button 41 (step 202).

The shapes of the rims 35A and 35B are sequentially measured by operating the start button 40 (step 203).

In a measurement state, the data button 43 emits green light. When the shape measurement is completed, the data button 43 changes from green to red to inform the operator of the completion of the measurement.

The measurement data of the rims 35A and 35B having undergone the shape measurement are automatically transferred to the finishing machine or management computer (step 205).

When shape measurement (pattern tracing) for the frame template 300 is to be performed (step 206), the frame template 300 is attached to the holder 208 (step 207).

The cover 210 is then removed, and the holder 208 is positioned and fixed on the metal fitting 29 (step 208).

A condition (right side, left side) for shape measurement is set by using the select button 41 (step 209).

The measurement rod 108 is set, and the start button 40 is operated to perform shape measurement for the frame template 300 (step 210).

The shape measurement for the frame template 300 is completed through the steps 203, 204, and 205 described above.

When shape measurement (lens tracing) for the lens 207 is to be performed (step 211), the lens 207 is attached to the holder 208 (step 212). The cover 210 is then removed, and the holder 208 is positioned and fixed on the metal fitting 29 (step 213). The shape measurement for the lens 207 is completed through steps 209, 210, 203, 204, and 205 described above.

Figure 21:
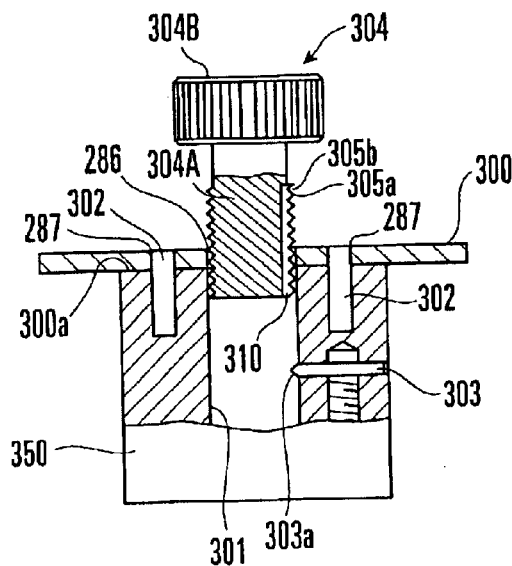
FIG. 21 is a view for explaining a procedure for mounting a frame template.

The frame template 300 is made of a synthetic resin, and has a central hole 286 and two positioning holes 287 on two sides of the central hole 286, as shown in FIG. 21. The upper and lower surfaces of the single frame template 300 are used for the left eye (L) and right eye (R), respectively.

The lens 207 is an edged lens. Two types of such lenses having symmetrical shapes are prepared for the left eye (L) and right eye (R) for each size.

Referring to FIGS. 1, 2, and 19 to 23, the holder 208 has a metal holder body 290. The holder body 290 is constituted by a fixed portion 290A in the form of a substantially square plate and an arm portion 290B in the form of a square bar which integrally extends from the rear end of the fixed portion 290A. Pairs of permanent magnets 292a and 292b, and 293a and 293b are respectively embedded in upper and lower surfaces 291a and 291b of the fixed portion 290A. The permanent magnets 292a, 292b, 293a, and 293b serve to fix the holder 208 to a holder mount portion B of the metal fitting 29, and are properly arranged at intervals in the back and forth direction so as to be located on a center line in the widthwise direction of the fixed portion 290A.

In addition, the permanent magnets 292a and 292b on the upper surface respectively oppose the permanent magnets 293a and 293b on the lower surface. The fixed portion 290A has two positioning pins 294a and 294b and one detection pin 295 which extend through the upper and lower surfaces 291a and 291b. The two positioning pins 294a and 294b are used to position the holder 208 to the holder mount portion B of the metal fitting 29, and formed on both sides of the permanent magnets 292a and 293a on the front side at almost equal distances therefrom.

Figure 20:
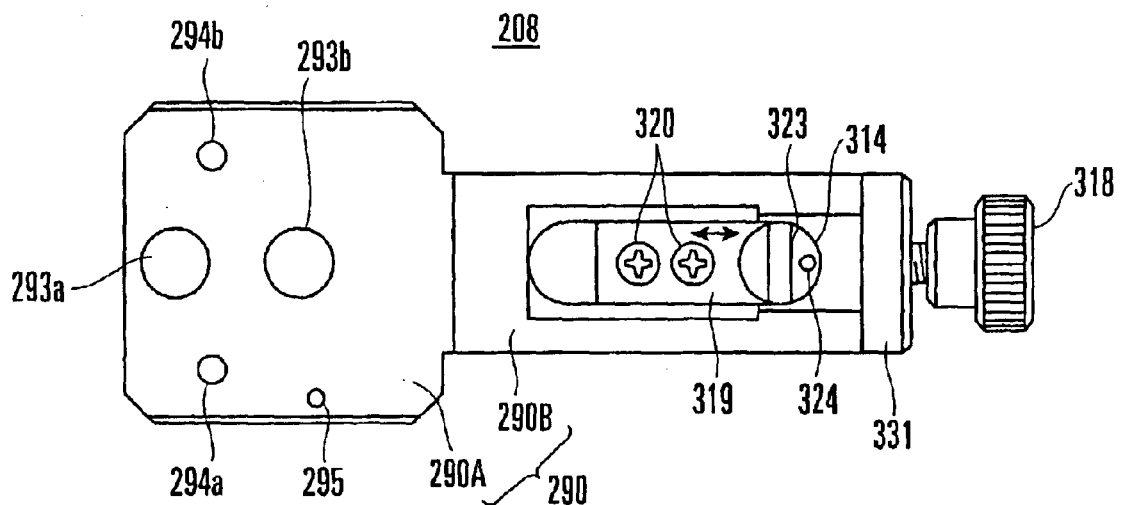
FIG. 20 is a bottom view of the holder.

The detection pin 295 is used to discriminate the measurement modes for the frame template 300 and lens 207, and formed such that the upper end is located on the left side of the upper permanent magnet 292b. Consequently, the lower end of the detection pin 295 is located on the right side of the lower permanent magnet 293b, as shown in FIG. 20.

The arm portion 290B is in the form of a square bar which is smaller in width and larger in thickness and length than the fixed portion 290A. An upper surface 296a is flush with the upper surface 291a of the fixed portion 290A, and a lower surface 296b is located below the lower surface 291b. The upper surface of the distal end portion of the arm portion 290B forms a template mount portion 297. A template fixing bracket 350 is fixed to the template mount portion 297. The template fixing bracket 350 has a rectangular block-like shape whose upper surface forms a mount surface 300a of the frame template 300. As shown in FIG. 21, a screw mount hole 301 is formed in this mount surface 300a, and two positioning pins 302 extend from two sides of this screw mount hole 301. The positioning pins 302 are fitted in the positioning holes 287 of the frame template 300 to position the frame template 300 to the mount surface 300a.

In addition, a fixing pin 303 is driven into one side surface of the template fixing bracket 350. This fixing pin 303 serves to fix a set screw 304 in the screw mount hole 301. The set screw 304 is used to fix the frame template 300 to the mount surface 300a. A distal end portion 303a is formed into a conical shape and protrudes into the screw mount hole 301. The protrusion length is set to be slightly smaller than the height of a thread 305a (the depth of a thread groove 305b) of the set screw 304.

As shown in FIG. 21, the set screw 304 is constituted by a male thread portion 304A inserted into the screw mount hole 301 through the central hole 286 of the frame template 300, and a head portion 304B integrally formed with the proximal end of the male thread portion 304A. A pin guide groove 310 elongated in the axial direction is formed in the surface of the male thread portion 304A. The distal end of the pin guide groove 310 is open to the distal end face of the male thread portion 304A. The groove width of the pin guide groove 310 is set to be larger than the outer diameter of the fixing pin 303 to allow it to be inserted. A double-start thread is formed on the male thread portion 304A, and the thread 305a and the thread groove 305b are separated by the pin guide groove 310. Knurls (recesses and projections) are formed on the circumferential surface of the head portion 304B by a knurling process to prevent slipping at the time of operation. In this embodiment, since a multi-start thread like the double-start thread described above is used as the set screw 304, the distal end of the fixing pin can be fitted in the thread groove by only slightly moving the set screw 304 back and forth.

Figure 19:
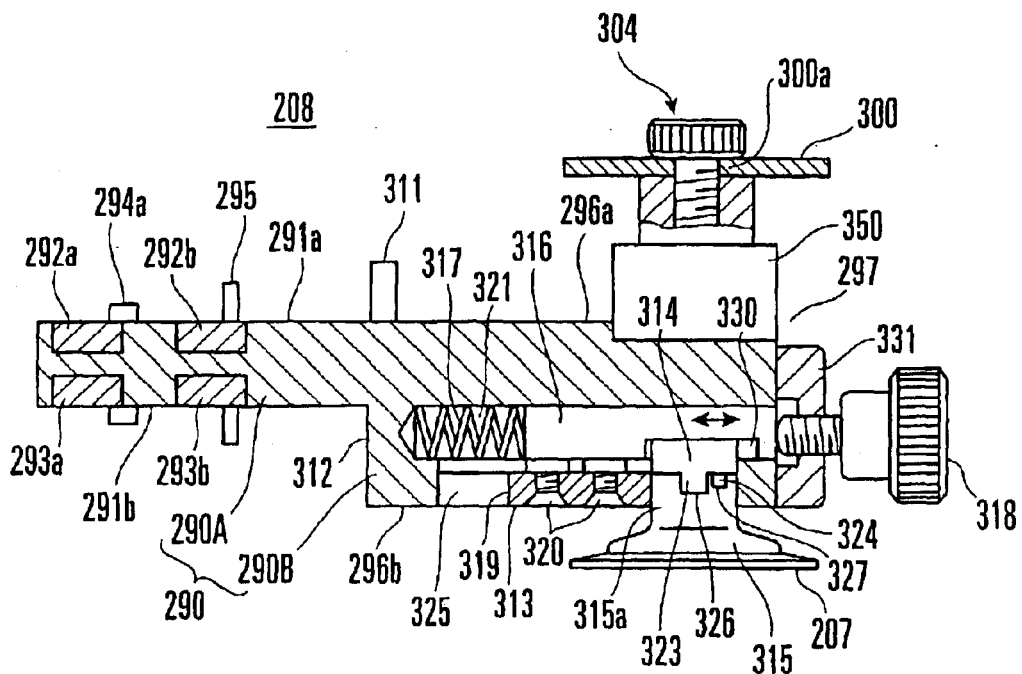
FIG. 19 is a sectional view of a holder.

Referring to FIG. 19, a stopper pin 311 protrudes from the upper surface of the holder body 290 at the boundary portion between the fixed portion 290A and the arm portion 290B. In measuring shape of the frame template 300, when the holder 208 is turned over and mounted on the holder mount portion B of the metal fitting 29, the stopper pin 311 comes into contact with the rear surface of the clamping unit 34A on the front side to prevent the clamping unit 34A from moving backward.

A front end face 112 of the arm portion 290B is located below the fixed portion 290A. In measuring the shape of the lens 207, when the holder 208 is mounted in a normal state on the holder mount portion B of the metal fitting 29, the front end face 112 comes into contact with the rear surface of the clamping unit 34A on the front side, as shown in FIG. 2, thereby forming a stopper surface which prevents the clamping unit 34A from moving backward.

A lens mount portion 313 is formed on the lower surface of the arm portion 290B. This lens mount portion 313 has a cup shaft 314 on which a leap cup 315 for holding the lens 207 is detachably fitted, a lens press shaft 316 movable in the longitudinal direction of the holder body 290, a helical compression spring 317 serving as a biasing means for biasing the lens press shaft 316 backward from the holder body 290, and a set screw 318 for moving the lens press shaft 316 in a direction opposite to the biasing direction of the helical compression spring 317, i.e., forward.

A leap press 319 which fixes a base 315a of the leap cup 315 to the holder body 290 by pressing the base 315a backward is fixed to the lower surface of the lens press shaft 316 with a plurality of set screws 320.

The cup shaft 314, lens press shaft 316, and helical compression spring 317 are stored in a storage hole 321 which is formed in the inner central portion of the arm portion 290B so as to be elongated in the back and forth direction. The storage hole 321 is open to the rear end face of the arm portion 290B.

The cup shaft 314 has a small disk-like shape. A fitting portion 323 and positioning projection 324 protrude from the lower surface of the cup shaft 314. The fitting portion 323 is a protrusion having a rectangular cross-section and is formed in the center of the cup shaft 314 to extend in the radial direction. The cup shaft 314 is fixed in the rear end portion of the storage hole 321, and the fitting portion 323 and positioning projection 324 protrude into a long groove 325 which is formed in the lower surface 296b of the arm portion 290B so as to be elongated in the back and forth direction. The central portion of the long groove 325 communicates with the storage hole 321.

The upper surface of the base 315a of the leap cup 315 has a fitting recess portion 326 in which the fitting portion 323 of the cup shaft 314 is fitted, and a small fitting recess portion 327 in which the positioning projection 324 is fitted. The lens 207 is fixed to the lower surface of the leap cup 315 with a double coated adhesive tape.

The lens press shaft 316 is slidably disposed in the storage hole 321. A recess portion 330 elongated in the back and forth direction is formed in the rear end portion of the lower surface of the lens press shaft 316 to prevent interference with the cup shaft 314. The helical compression spring 317 is stored on the front side of the storage hole 321 to bias the lens press shaft 316 in the direction of the set screw 318, i.e., backward.

The set screw 318 serves to release the leap cup 315 from the pressed state produced by the leap press 319, and is screwed into a screw base 331 fixed to the rear end face of the arm portion 290B. The distal end face of the set screw 318 is in contact with the rear end face of the lens press shaft 316. A triple thread is formed on the set screw 318.

The leap press 319 is slidably stored in the long groove 325. When the lens press shaft 316 is moved backward by the biasing force of the helical compression spring 317, the leap press 319 is moved backward together and pressed against the front surface of the base 315a of the leap cup 315. By pressing the base 315a against the rear terminal end wall of the long groove 325 in this manner, the leap cup 315 is fixed to the holder body 290 to prevent it from coming off the cup shaft 314.

Figure 22:
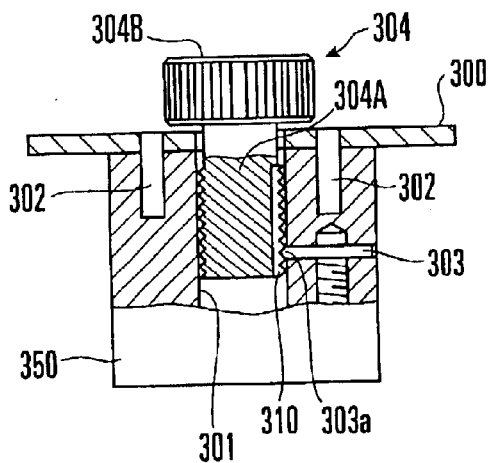
FIG. 22 is a view for explaining a procedure for mounting the frame template.

In the holder 208 having this structure, in order to mount the frame template 300 on the mount surface 300a of the template fixing bracket 350, the positioning pins 302 is fitted in the positioning holes 287 to position the frame template 300 and bring it into contact with the mount surface 300a (FIG. 21). The set screw 304 is then inserted into the screw mount hole 301 of the template fixing bracket 350 through the central hole 286 of the frame template 300. At this time, the set screw 304 is so inserted as to prevent the distal end portion 303a of the fixing pin 303 from contacting and damaging the thread 305a of the male thread portion 304A or not to damage the pin itself. That is, the set screw 304 is inserted into the screw mount hole 301 such that the fixing pin 303 and pin guide groove 310 are matched with each other to position the distal end portion 303a in the pin guide groove 310 (FIG. 21). The head portion 304B of the set screw 304 is then held with a hand and rotated in the direction to fasten it (FIG. 22).

Figure 23:
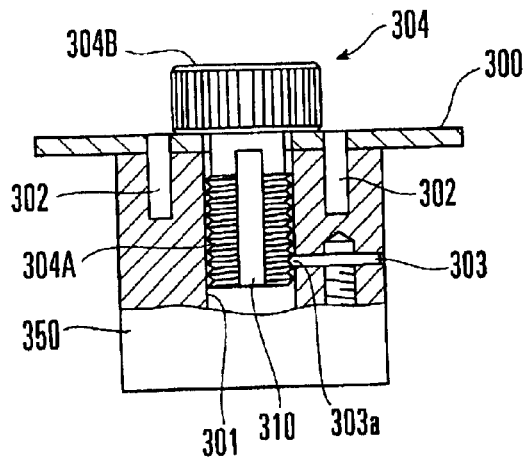
FIG. 23 is a view for explaining a procedure for mounting the frame template.

In this case, since the threads 305a and thread grooves 305b (FIG. 21) which form the male thread portion 304A are alternately formed on the open end edge of the side wall of the pin guide groove 310, the distal end portion 303a may coincide with thread 305a depending on the position of the fixing pin 303. In this case, even if the set screw 304 is rotated, it cannot be fastened because the distal end portion 303a comes into contact with the thread 305a. For this reason, the set screw 304 is slightly (by about ½ pitch) moved in the loosening direction to match the distal end portion 303a of the fixing pin 303 with the thread groove 305b. When the set screw 304 is rotated in the fastening direction in this state, the distal end portion 303a of the fixing pin 303 moves outside the pin guide groove 310 and shifts to the thread groove 305b. As the set screw 304 is fastened, the groove wall of the thread groove 305b is pressed against the distal end portion 303a of the fixing pin 303 to fix the set screw 304 to the screw mount hole 301, thereby fixing the frame template 300 to the mount surface 300a of the template fixing bracket 350. FIG. 23 shows this state. In this case, the number of turns required to fasten the set screw 304 is within one turn.

Since the male thread portion 304A of the set screw 304 is a double-start thread, the distance the set screw 304 advances can be set to be double the pitch of the male thread portion 304A. In other words, since the interval between the thread 305a and the thread groove 305b is ½ the pitch of a single-start thread, the distal end portion 303a of the fixing pin 303 can be matched with the thread groove 305b by slightly moving the set screw 304 in the axial direction.

When the frame template 300 is to be removed from the holder 208, the set screw 304 is rotated in the loosening direction to return the distal end portion 303a of the fixing pin 303 into the pin guide groove 310. At this time, the set screw 304 is rotated within one turn as in the case of fastening operation. After the distal end portion 303a of the fixing pin 303 is returned into the pin guide groove 310, the set screw 304 is pulled out from the screw mount hole 301 and central hole 286, and the frame template 300 is removed from the holder 208.

With such a mount structure for the frame template 300, the frame template 300 can be mounted by only inserting the set screw 304 into the screw mount hole 301 with the fixing pin 303 matching the pin guide groove 310, and then fastening the set screw 304 at a rotational angle within one turn. This makes it possible to easily and quickly mount the frame template 300. In addition, the frame template 300 can be easily and quickly removed by only loosening the set screw 304 at a rotational angle within one turn.

In order to mount the lens 207 on the lens mount portion 313 of the holder 208, the lens 207 is fixed to the lower surface of the leap cup 315 with a double coated adhesive tape.

Subsequently, the fitting recess portion 326 of the leap cup 315 is fitted on the fitting portion 323 of the cup shaft 314, and at the same time, the positioning projection 324 is fitted in the fitting recess portion 327. At this time, the set screw 318 is fastened in advance to move the lens press shaft 316 forward against the helical compression spring 317 in order to facilitate mounting the leap cup 315 on the cup shaft 314.

When the set screw 318 is loosened after the leap cup 315 is fitted on the cup shaft 314, the lens press shaft 316 is moved backward by the biasing force of the helical compression spring 317. As a consequence, the leap press 319 presses the base 315a of the leap cup 315 backward and presses it against the rear terminal end wall of the long groove 325, thereby mounting the lens 207 on the holder 208. The helical compression spring 317 presses the lens press shaft 316, and the leap press 319 presses the leap cup 315 against the holder body 290. Therefore, there is no chance that the leap cup 315 will come off the cup shaft 314.

When the lens 207 is to be removed from the holder 208, the set screw 318 is fastened to move the lens press shaft 316 forward against the helical compression spring 317, thereby releasing the leap cup 315 the pressed state produced by the leap press 319. Thereafter, the leap cup 315 is removed from the cup shaft 314.

In this case, since the set screw 318 is a triple thread, the distance it advances after one turn is three times that a general single-start thread advances. That is, the distance a screw advances increases by a multiple of the number of threads. This allows the lens 207 to be quickly evacuated so as to quickly release the leap cup 315 from the pressed state by the leap press. Therefore, the lens 207 can be quickly attached and detached.

The holder 208 has the template mount portion 297 and lens mount portion 313 respectively provided on the upper and lower surfaces of the holder body 290. When, therefore, the frame template 300 is to be measured, the holder 208 is turned over to allow the frame template 300 to be mounted in the housing 21. When the lens 207 is to be measured, the holder 208 is positioned and fixed to the holder mount portion B of the metal fitting 29 with the template mount portion 297 facing upward so as to allow the lens 207 to be mounted in the housing 21.

The holder mount portion B of the metal fitting 29 and an automatic discrimination mechanism for discriminating the measurement modes for the frame template 300 and lens 207 will be described next.

Referring to FIGS. 24 to 27, the metal fitting 29 on which the holder 208 is mounted is made of a magnetic material, and has an upper surface serving as the holder mount portion B. The holder mount portion B has first and second fixing portions 340A and 340B on which the holder 208 is selectively positioned and fixed. The first and second fixing portions 340A and 340B are spaced apart from each other by a predetermined distance in the width direction of the metal fitting 29. The first fixing portion 340A is at a position where the holder 208 is fixed when a left frame template 300(L) or left lens 207(L) is to be measured. The second fixing portion 340B is at a position where the holder 208 is fixed when a right frame template 300(R) or right lens 207(R) is to be measured.

Two positioning holes 341a and 341b and two detection holes 343a and 343b are formed in the first fixing portion 340A in correspondence with the two positioning pins 294a and 294b and the detection pin 295 extending from the fixed portion 290A of the holder body 290. Likewise, two positioning holes 342a and 342b and two detection holes 344a and 344b are formed in the second fixing portion 340B in correspondence with the two positioning pins 294a and 294b and the detection pin 295 extending from the fixed portion 290A of the holder body 290. The positioning holes 341a, 341b, 342a, and 342b may be through holes extending through the lower surface of the metal fitting 29 or blind holes formed therein. The detection holes 343a, 343b, 343b, 344a, and 344b are holes extending through the lower surface of the metal fitting 29.

A total of four sensors, i.e., first to fourth sensors SW1, SW2, SW3, and SW4, are arranged in twos on left and right portions of the lower surface of the metal fitting 29 which correspond to the first and second fixing portions 340A and 340B. These sensors and the above detection pins 295 constitute an automatic discrimination mechanism K in shape measurement for the frame template 300 and lens 207.

The arrangement and the like of the automatic discrimination mechanism K will be described in more detail. Each of the first to fourth sensors SW1, SW2, SW3, and SW4 has a light-emitting element and light-receiving element arranged to face each other through a corresponding one of the detection holes 343a, 343b, 344a, and 344b, and optically detects the detection pin 295 of the holder 208. Each sensor is normally held in an OFF state wherein light from the light-emitting element is received by the light-receiving element. When light from the light-emitting element is blocked by the detection pin 295, the sensor is turned on. The resultant signal is sent out to a control section. Upon reception of a detection signal from one of the first to fourth sensors SW1, SW2, SW3, and SW4, the control section automatically discriminates whether the measurement mode for the frame template 300 or lens 207 is to be set and the left or right frame template 300 or left or right lens 207 is to be measured, and switches the measurement modes.

An example of this operation will be described below. When a left frame template or lens is to be measured, the holder 208 is fixed to the first holding portion 340A. At this time, the first or second sensor SW1 or SW2 detects the mounting of the holder 208. When a right flame template or lens is to be measured, the holder 208 is fixed on the second fixing portion 340B. At this time, the third or fourth sensor SW3 or SW4 detects the mounting of the holder 208.

Another example of the operation will be described below. When a left frame template or lens is to be measured, the holder is fixed on the first fixing portion 340A. If the left frame template is mounted at this time, the first sensor SW1 detects this. If the left lens is mounted, the second sensor SW2 detects this. When a right frame template or lens is to be measured, the holder is fixed on the second fixing portion 340B. If the right frame template is mounted at this time, the third sensor SW3 detects this. If the right lens is mounted, the fourth sensor SW4 detects this.

Figure 24:
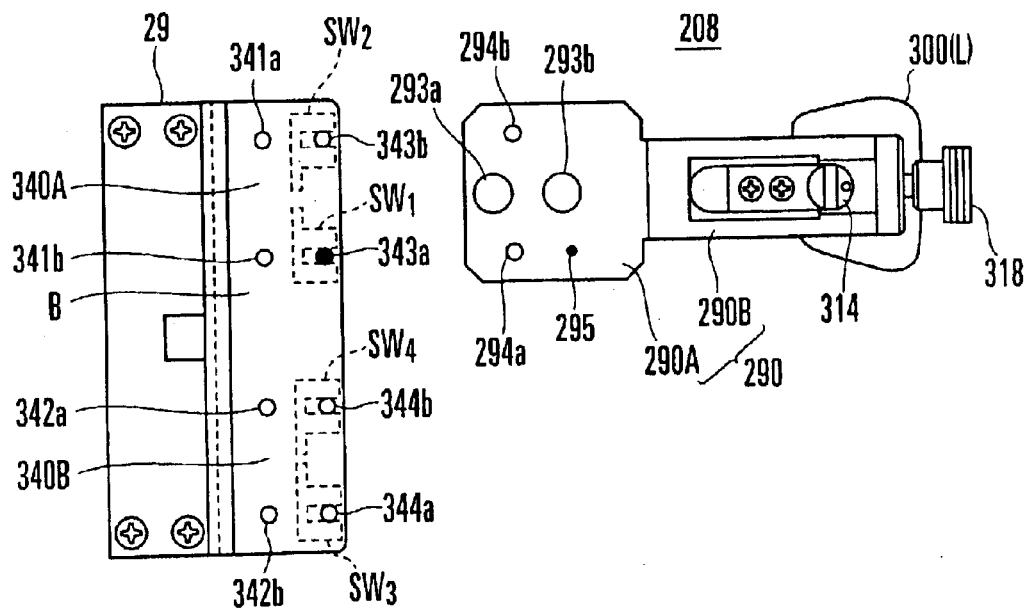
FIG. 24 is a view showing the mount position of the holder and the positions of sensors when a left frame template is measured.

More specifically, when the left frame template 300(L) is to be measured, the frame template 300(L) is positioned to a mount surface 100a of the holder 208 and fixed thereto with the set screw 304. Thereafter, as shown in FIG. 24, the holder 208 is turned over to position the frame template 300(L) on the lower side, and the fixed portion 290A of the holder body 290 is positioned and fixed on the first fixing portion 340A of the metal fitting 29. This positioning and fixing operation can be done by inserting the two positioning pins 294a and 294b into the positioning holes 341a and 341b and magnetically attaching the permanent magnets 292a and 292b and the metal fitting 29 to each other.

At this time, the detection pin 295 is inserted into the left detection hole 343a. As a consequence, the detection pin 295 blocks the light emitted from the light-emitting diode of the first sensor SW1, and the sensor SW1 is turned on. The resultant signal is then sent out to the control section. The control section detects, based on the detection signal from the sensor SW1, that the left frame template 300(L) is mounted on the first fixing portion 340A through the holder 208, and issues a command to perform shape measurement for the left frame template 300(L) by using the measurement rod 108.

Figure 25:
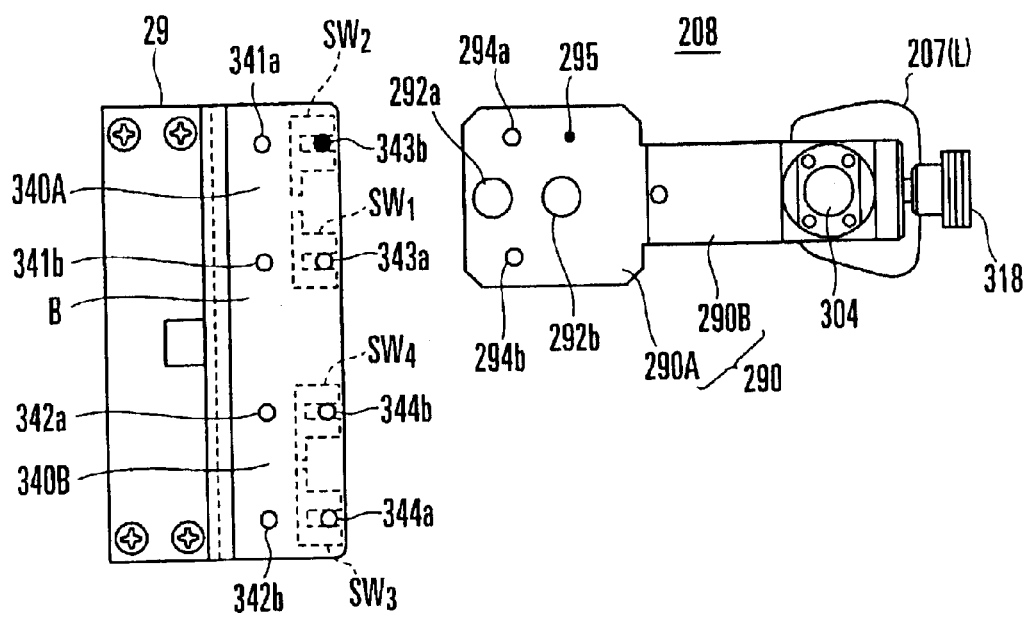
FIG. 25 is a view showing the mount position of the holder and the positions of the sensors when a left lens is measured.

When the left lens 207(L) is to be measured, the lens 207(L) is mounted on the holder 208. More specifically, the leap cup 315 (FIG. 19) on which the lens 207(L) is mounted is fitted on the cup shaft 314. The lens press shaft 316 is then moved backward by the biasing force of the helical compression spring 317 to make the leap press 319 press the base 315a of the leap cup 315 and fix it to the rear terminal end wall of the long groove 325. The holder 208 on which the lens 207(L) is mounted is then positioned and fixed on the first fixing portion 340A of the metal fitting 29, as shown in FIGS. 2 and 25. This positioning and fixing operation can be done by inserting the two positioning pins 294a and 294b into the positioning holes 341a and 341b and magnetically attaching the lower permanent magnets 293a and 293b and the metal fitting 29 to each other. In this case, the holder 208 need not be turned over, and the detection pin 295 is inserted into the left detection hole 343b. As a consequence, the detection pin 295 blocks the light emitted from the light-emitting diode of the sensor SW2 to turn on the sensor SW2. The detection signal is then sent out to the control section. The control section detects, based on the signal from the sensor SW2, that the left lens 207(L) is mounted on the fixing portion 340A through the holder 208, and issues a command to perform shape measurement for the left lens 207(L) by using the measurement rod 108.

When the right frame template 300(R) is to be measured, the frame template 300(R) is fixed to the holder 208.

Figure 26:
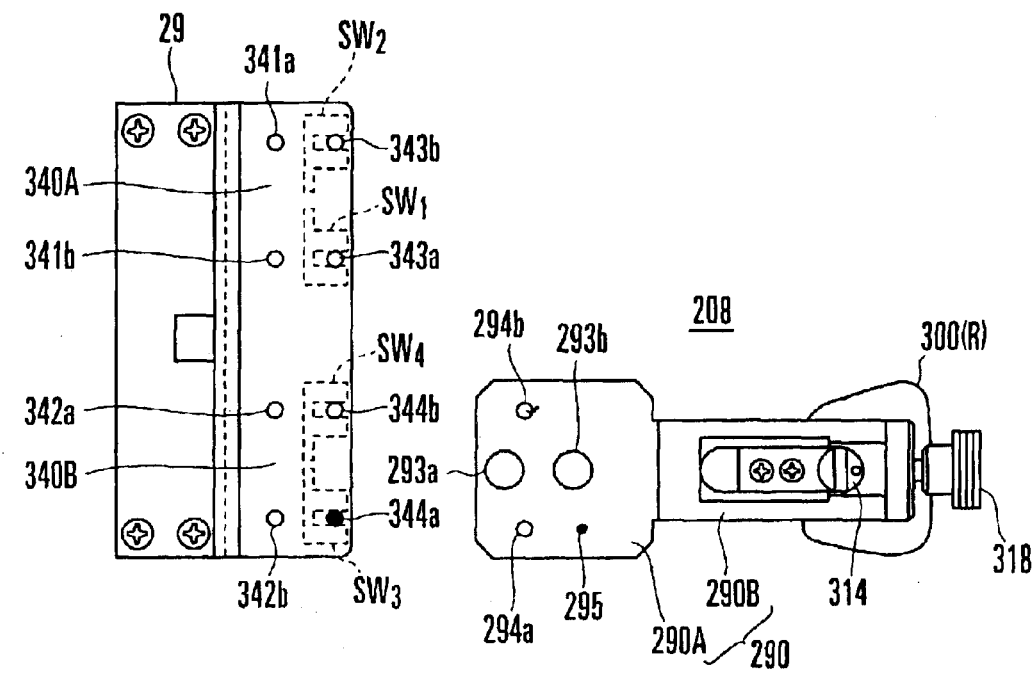
FIG. 26 is a view showing the mount position of the holder and the positions of the sensors when a right frame template is measured.
Figure 27:
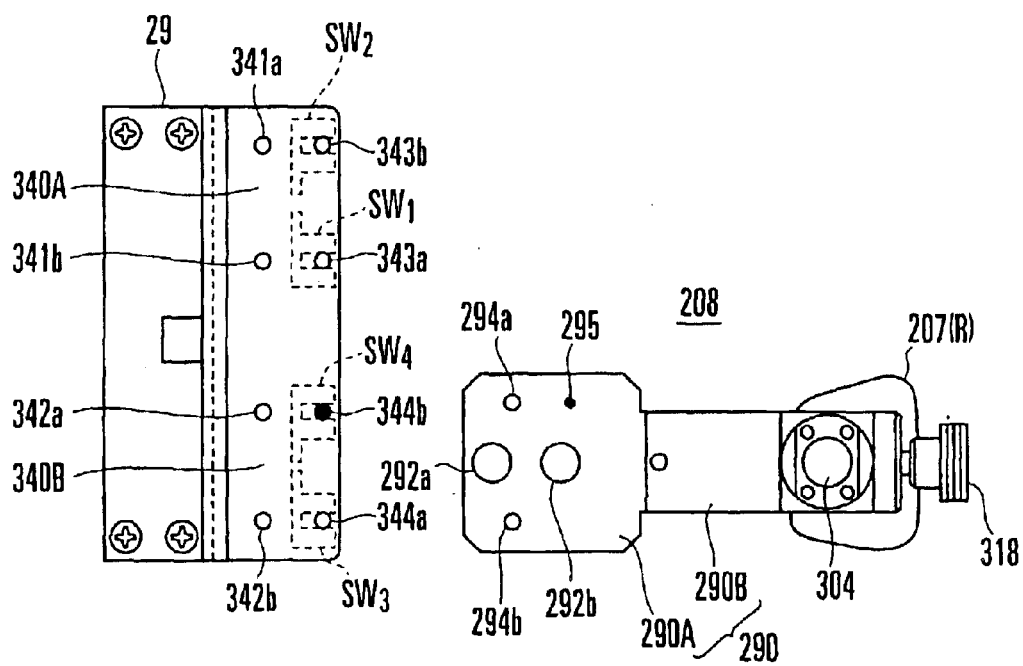
FIG. 27 is a view showing the mount position of the holder and the positions of the sensors when a right lens is measured.

Thereafter, as shown in FIG. 26, the holder 208 is turned over to position the frame template 300(R) on the lower side, and the fixed portion 290A of the holder body 290 is positioned and fixed on the fixing portion 340B of the metal fitting 29. This positioning and fixing operation can be done by inserting the two positioning pins 294a and 294b into the positioning holes 342a and 342b and magnetically attaching the permanent magnets 292a and 292b and the metal fitting 29 to each other. At this time, the detection pin 295 is inserted into the right detection hole 344a. As a consequence, the detection pin 295 blocks the light emitted from the light-emitting diode of the sensor SW3, and the sensor SW3 is turned on. The detection signal is then sent out to the control section. The control section detects, based on the detection signal from the sensor SW3, that the right frame template 300(R) is mounted on the fixing portion 340B through the holder 208, and issues a command to perform shape measurement for the right frame template 300(R) by using the measurement rod 108.

When the right lens 207(R) is to be measured, the lens 207(R) is mounted on the lens mount portion 313 of the holder 208, and the holder 208 is then positioned and fixed on the fixing portion 340B of the metal fitting 29, as shown in FIG. 21, as in the case of the left lens 207(L). This positioning and fixing operation can be done by inserting the two positioning pins 294a and 294b into the positioning holes 342a and 342b and magnetically attaching the lower permanent magnets 293a and 293b and the metal fitting 29 to each other. In this case, the holder 208 need not be turned over. When the holder 208 is fixed to the fixing portion 340B, the detection pin 295 is inserted into the left detection hole 344b. As a consequence, the detection pin 295 blocks the light emitted from the light-emitting diode of the sensor SW4, and the sensor SW4 is turned on. The detection signal is then sent out to the control section. The control section detects, based on the detection signal from the sensor SW4, that the right lens 207(R) is mounted on the fixing portion 340B through the holder 208, and issues a command to perform shape measurement for the right frame template 300(R) by using the measurement rod 108.

As described above, the first and second fixing portions 340A and 340B are provided on the holder mount portion B, and a total of four sensors, i.e., the sensors SW1, SW2, SW3, and SW4 are arranged in twos on the respective fixing portions 340A and 340B. In this arrangement, on the basis of detection signals from these sensors, the measurement modes for the frame template 300 and lens 207 and the left and right frame templates 300 and right lenses 207 can be discriminated. This eliminates the need for the operator to designate a measurement mode on the control panel 22 side for each measurement, thus reducing the load on the operator. This, in particular, makes it possible to prevent the operator from making a designation error.

FIG. 28 shows the ON and OFF states of the first to fourth sensors SW1, SW2, SW3, and SW4 and a fifth sensor SW5. Referring to FIG. 28, the fifth sensor SW5 is turned on and off by the clamping unit 34A or 34B described above. This switch is kept on while the clamping units 34A and 34B are kept spaced part from each other during measurement of the frame template 300 or lens 207. The switch is turned off when the clamping units 34A and 34B approach and clamp the spectacle frame 24 to measure the rim shape of the spectacle frame 24. When the resultant signal is sent out to the control section, the control section detects that the spectacle frame 24 is mounted, and issues a command to perform shape measurement for the spectacle frame by using the measurement element 37.

The above embodiment has exemplified the case wherein the frame discrimination between template 300 and lens 207 and discrimination between measurement for the left eye and measurement for the right eye are performed by using the first to fourth sensors SW1, SW2, SW3, and SW4. However, the present invention is not limited to this. If measurement for the left eye or right eye is designated by using an operation switch, two sensors SW can be omitted.

The first, second, third, and fourth sensors (SW1, SW2, SW3, and SW4) detect the detection pin 295 to detect that the holder 208 is mounted on the first or second fixing portion 340A or 340B. In this case, shifting the detection pin 295 from the center of the holder 208 to the left or right will prevent the operator from erroneously mounting the holder 208 when mounting it upon turning it over.

As the sensors SW1 to SW4, sensors that optically detect the detection pin 295 are used.

The relationship between the rims 35A and 35B of the spectacle frame 24 and the contact portion 37C of the measurement element 37 will be described below with reference to FIGS. 12 to 18C.

Referring to FIG. 12, the frame grooves 36 of the rims 35A and 35B are generally formed into V-shaped grooves with opening angles $\alpha$ of 110°, 100°, and 90°. In addition, the angle of a bevel grinding wheel is standardized to 120° and hence is always constant. Bevel lenses with an angle of 120° are fitted in spectacle frames having frame grooves 36 with any opening angles $12\alpha$.

On the other hand, the contact portion 37C of the measurement element 37 is formed into a convex hemispherical shape, and the diameter D is set to be larger than 1.6 mm and smaller than 2.2 mm (1.6 mm<D<2.2 mm) regardless of the opening angle $\alpha$. Assume that the diameter D is set within the range of 1.6 mm<D<2.2 mm in this manner. If the diameter D remains the same, the distances R from the bevel vertex S to the center $O_0$ of the contact portion 37C become approximately equal to each other when the 120° bevel V (V-shaped projection) of the contact portion 37C comes into contact with the frame groove 36. This makes it unnecessary to change a correction value to be added to measurement data depending on the opening angle $\alpha$, thus allowing correction with the same correction value. If the diameter D is equal to or smaller than 1.6 mm, the differences between the distances R increase undesirably. If the diameter is equal to or larger than 2.2 mm, the differences between the distances R decrease, but the distances from the deepest portion of the frame groove 36 to contact points $P_1$ and $P_2$ of the contact portion 37C increase. This undesirably makes it easier for the measurement element 37 to come off the frame groove 36.

FIGS. 13A to 18C show the distances R when the opening angles $\alpha$ of the frame grooves 36 are respectively set to 110°, 100°, and 90°, and the diameters D of the contact portions 37C are respectively set to 1.6 mm, 1.8 mm, 2.0 mm, 2.1 mm, 2.2 mm, and 2.4 mm.

As shown in FIGS. 13A to 13C, when the diameter D is set to 1.6 mm, R=0.896 mm in the case of $\alpha$=110° shown in FIG. 13A; R=0.875 mm in the case of $\alpha$=100° shown in FIG. 13B; and R=0.861 mm in the case of $\alpha$=90° shown in FIG. 13C. The difference between the distance with $\alpha$=110° and that with $\alpha$=90° is 0.035 mm (0.896–0.861). In consideration of the meaning of this difference, 0.035 mm, the perimeter of the frame groove 36 can be regarded as one criterion.

In general, as the difference between the perimeter of the frame groove 36 of each of the rims 35A and 35B and the perimeter of the bevel V formed in the outer circumference of a lens by a bevel process exceeds 0.2 mm, the fit state between the lens 207 and the frame groove 36 deteriorates. Assume that the frame shape of the spectacle frame 24 is regarded as a circle. In this case, if the above difference in the radial direction becomes 0.35 mm, this error in the frame as a whole increases by about six times ($2\pi=2\times3.14$) to become about 0.21 mm, which exceeds the above allowable error, 0.2 mm.

Consider an allowable diameter error near 0.2 mm. When the diameter D is set to 1.6 mm, as shown in FIGS. 13A to 13C, R=1.018 mm in the case of $\alpha=110°$ shown in FIG. 14A; R=1.005 mm in the case of $\alpha=100°$ shown in FIG. 14B; and R=1.002 mm in the case of $\alpha=90°$ shown in FIG. 14C. The difference between the distance with $\alpha=110°$ and that with $\alpha=90°$ is 0.016 mm. The error in the frame as a whole becomes 0.096 mm ($2\pi\times0.016$), which is sufficiently smaller than the above allowable error, 0.2 mm.

When the diameter D is set to 2.0 mm, as shown in FIGS. 15A to 15C, R=1.14 mm in the case of $\alpha=110°$ shown in FIG. 15A; R=1.136 mm in the case of $\alpha=100°$ shown in FIG. 15B; and R=1.136 mm in the case of $\alpha=90°$ shown in FIG. 15C. The difference between the distance with $\alpha=110°$ and that with $\alpha=90°$ is 0.004 mm. The error in the frame as a whole becomes 0.024 mm, which is sufficiently smaller than the above allowable error, 0.2 mm.

When the diameter D is set to 2.1 mm, as shown in FIGS. 16A to 16C, R=1.201 mm in the case of $\alpha=110°$ shown in FIG. 16A; R=1.2 mm in the case of $\alpha=100°$ shown in FIG. 16B; and R=1.2 mm in the case of $\alpha=90°$ shown in FIG. 16C. The difference between the distance with $\alpha=110°$ and that with $\alpha=90°$ is 0.001 mm. The error in the frame as a whole becomes 0.006 mm ($2\pi\times0.001$), which is sufficiently smaller than the above allowable error, 0.2 mm.

When the diameter D is set to 2.2 mm, as shown in FIGS. 17A to 17C, R=1.262 mm in the case of $\alpha=110°$ shown in FIG. 17A; R=1.262 mm in the case of $\alpha=100°$ shown in FIG. 17B; and R=1.262 mm in the case of $\alpha=90°$ shown in FIG. 17C. The difference between the distance with $\alpha=110°$ and that with $\alpha=90°$ becomes zero.

On the other hand, as the diameter D of the contact portion 37C increases as shown in FIGS. 17A to 17C, the contact points with the frame groove 36 move outside. This undesirably makes it easier for the contact portion 37C to come off the frame groove 36.

When the diameter D is set to 2.4 mm, as shown in FIGS. 18A to 18C, R=1.383 mm in the case of $\alpha=110°$ shown in FIG. 18A; R=1.383 mm in the case of $\alpha=100°$ shown in FIG. 18B; and R=1.262 mm in the case of $\alpha=90°$ shown in FIG. 18C. The difference between the distance with $\alpha=110°$ and that with $\alpha=90°$ becomes zero. However, the contact portion 37C undesirably easily comes off the frame groove 36.

The diameter D of the contact portion 37C is therefore set to 1.6 mm or more and limited to a value near 2.1 mm at maximum.

The operation procedure of the spectacle frame shape measuring apparatus 20 having the above structure will be described next with reference to the flow chart of FIG. 29.

First of all, the apparatus is powered on (step 200). When shape measurement (frame tracing) for the rims 35A and 35B is to be performed (step 201), the spectacle frame 24 is inserted into the housing 21 through the opening portion 25, and the rims 35A and 35B are respectively clamped by the pair of clamping units 34A and 34B. A condition for shape measurement is then set by using the select button 41 (step 202). The shapes of the rims 35A and 35B are sequentially measured by operating the start button 40 (step 203). In a measurement state, the data button 43 emits green light. When the shape measurement is completed, the data button 43 changes from green to red to inform the operator of the completion of the measurement. The measurement data of the rims 35A and 35B having undergone the shape measurement are automatically transferred to the finishing machine or management computer (step 205).

When shape measurement (pattern tracing) for the frame template 300 is to be performed (step 206), the frame template 300 is attached to the holder 208 (step 207). The cover 210 is then removed, and the holder 208 is positioned and fixed on the metal fitting 29 (step 208). A condition (right side, left side) for shape measurement is set by using the select button 41 (step 209). The measurement rod 108 is set, and the start button 40 is operated to perform shape measurement for the frame template 300 (step 210). The shape measurement for the frame template 300 is completed through the steps 203, 204, and 205 described above.

When shape measurement (lens tracing) for the lens 207 is to be performed (step 211), the lens 207 is attached to the holder 208 (step 212). The cover 210 is then removed, and the holder 208 is positioned and fixed on the metal fitting 29 (step 213). The shape measurement for the lens 207 is completed through steps 209, 210, 203, 204, and 205 described above.

In the spectacle frame shape measuring apparatus 20 having the above structure, in performing shape measurement for the rims 35A and 35B, the weight (e.g., 10 to 13 kg) of the movable member 85, which is constituted by the measurement element 37, rod 65, and the like and is vertically movable, is balanced with the spring force of the balance spring 80. Therefore, the contact portion 37C of the measurement element 37 can be brought into contact with the frame groove 36 in an almost loadless state.

In practice, since the loading position Rd of the measurement element 37 is set to be slightly higher (by about 1 to 5 mm) than the center of the frame groove 36, when the contact portion 37C is engaged with the frame groove 36, the measurement element 37 must be slightly pushed downward. For this reason, the balance spring 80 is compressed by an amount corresponding to the distance the measurement element 37 moves downward, and the rod 65 is pushed upward by the resultant reaction force to press the contact portion 37C against the upper groove wall of the frame groove 36. As a consequence, the reaction force of the balance spring 80 is added as a load to the frame groove 36. However, this load is very light and hence can be almost neglected. For information, assuming that the spring constant of the balance spring 80 is 0.32 (g/mm), the load imposed on the frame groove 36 when the measurement element 37 is lowered by 5 mm and engaged with the frame groove 36 is 1.6 g ($0.32\times5$), and the load imposed on the frame groove 36 when the measurement element 37 is vertically displaced by ±10 mm is ±3.2 g ($0.32\times10$). These loads are sufficiently lighter than the weight (10 to 13 g) of the movable member 85 and hence can be almost neglected.

Figure 30:
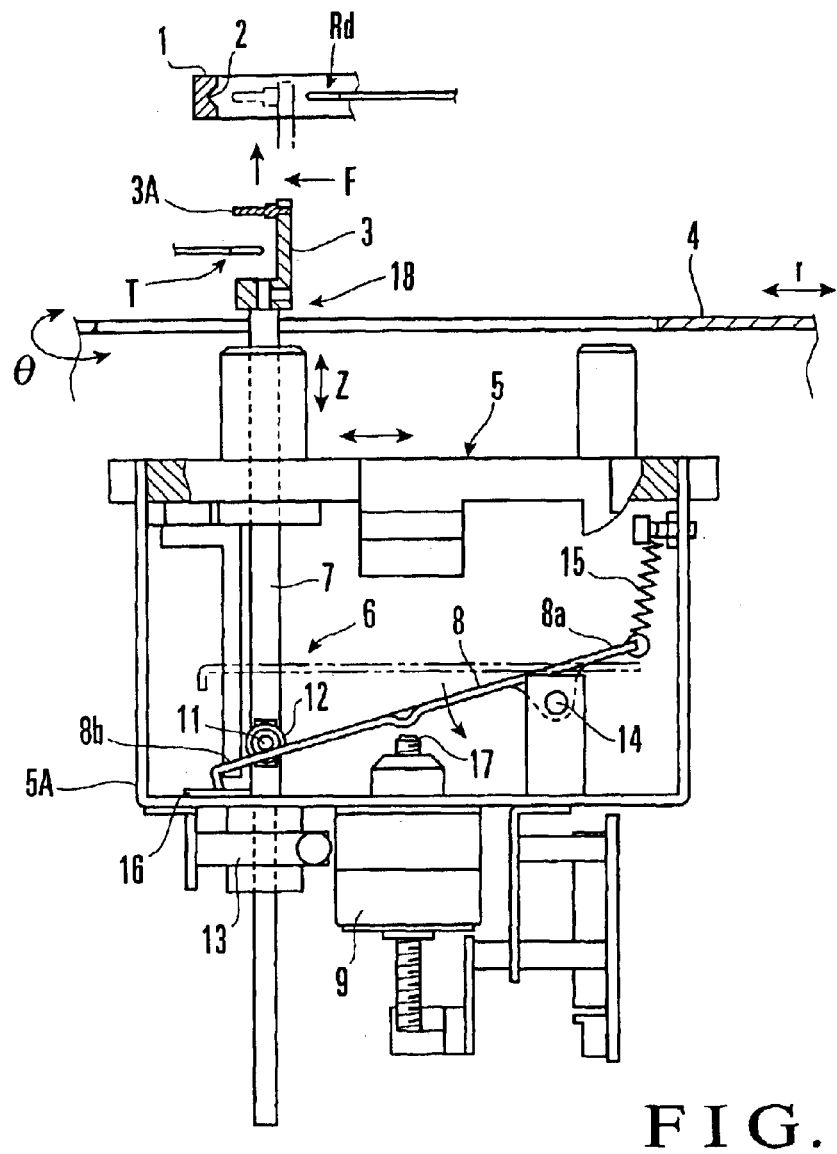
FIG. 30 is a sectional view of a conventional magnetic vertical driving mechanism.
Figure 31:
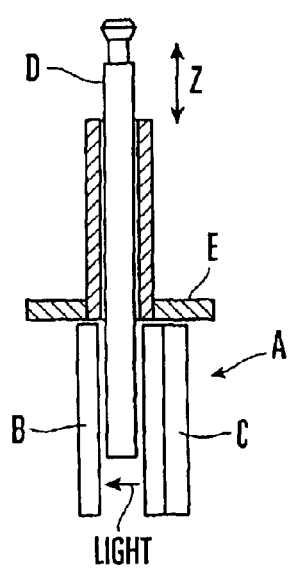
FIG. 31 is a sectional view of a conventional optical Z-axis measuring unit.

As a result, the contact portion 37C exhibits good follow-up characteristics with respect to the frame groove 36 at the time of measurement, and becomes hard to come off the frame groove 36. In addition, since an almost loadless state is realized, the measurement force F in the radial direction which presses the contact portion 37C of the measurement element 37 against the frame groove 36 can be reduced to about 30 g than the conventional apparatus shown in FIG. 30, thus further improving the follow-up characteristics of the contact portion 37C. With this structure, therefore, the rims 35A and 35B deform very little. This makes it possible to measure the displacement Z in the vertical direction with high precision.

As the balance spring and biasing spring used in the above embodiment, a helical compression spring, a helical extension spring, and the like are used. In addition, as the driving unit used in this case, a known means used for control operation, e.g., a linear stepping motor or a motor, is used.

In the above embodiment, the sensor head 101 is disposed on the slider 62 side, and the sensor rod 102 extends vertically from the plate 81. However, the present invention is not limited to this. The sensor head 101 may be fixed to the rod 65, and the sensor rod 102 may be disposed on the slider 62 side. That is, any structure can be used as long as it allows relative vertical movement of the sensor head 101 and sensor rod 102.

As described above, since the spectacle frame shape measuring apparatus according to the present invention has the Z-direction ME holding mechanism for holding the measurement element in an almost loadless state to make it vertically movable, the measurement pressure in the radial direction which presses the contact portion of the measurement element against the groove frame can be reduced. This prevents the measurement element from coming off a frame groove, and prevents a rim from deforming. Therefore, the displacement of the measurement element in the vertical direction can be accurately measured.

In addition, since the Z-direction ME holding mechanism is constituted by the vertically movable rod and the balance spring that pushes the rod upward and holds it at a predetermined position in a floating state during shape measurement, the resultant structure is simple and requires a small number of components. Therefore, this mechanism can be manufactured at a low cost.

Furthermore, the contact portion of the measurement element which comes into contact with a frame groove is formed into a hemispherical shape, and the diameter D is set to 1.6 mm<D<2.2 mm. Therefore, at all opening angles of 110°, 100°, and 90°, the distances from the bevel vertex to the center of the contact portion can be made approximately equal to each other. This makes it possible to only correct a measurement value by using a predetermined correction value regardless of the opening angle. In addition, there is no need to measure the opening angle of a frame groove in advance. Therefore, measurement can be made quickly, and the apparatus itself can be manufactured at a low cost.

In switching from a measurement state to a non-measurement state, the rod is forcibly lowered to be evacuated from the loading position to the evacuation position by the evacuating mechanism instead of by the self weight. This prevents the rod from being stopped in the process of evacuation, and allows the measurement element to be reliably evacuated to the evacuation position. In addition, the structure of the evacuating mechanism is simple.

The Z-axis measuring unit used in the present invention uses the sensor rod which is adjacent and parallel to the rod on which the measurement element 37 is mounted, and the sensor head disposed to be adjacent to the sensor rod. The sensor head or sensor rod is designed to move vertically in synchronism with the operation of the rod. Unlike in the prior art, therefore, there is no need to ensure a space for the Z-axis measuring unit below the rod on which the measurement element is mounted. This makes it possible to decrease the height of the spectacle frame shape measuring apparatus and reduce its size.

In addition, since it is only required to dispose the Z-axis measuring unit in a side space surrounding the rod inside the slider so as not to interfere with the evacuating mechanism, the Z-axis measuring unit can be easily mounted.

As described above, in the spectacle frame shape measuring apparatus according to the present invention, since the Z-axis measuring unit for detecting the displacement of the rod in the vertical direction as the displacement of the measurement element in the vertical direction is constituted by the sensor rod disposed on a side of the rod and the sensor head through which the sensor rod extends to be relatively vertically movable, there is no need to ensure an installation place for the Z-axis measuring unit below the rod. Therefore, the height of the spectacle frame shape measuring apparatus can be reduced to realize a compact structure as compared with the conventional apparatus.

In the above embodiment, a double-start thread is used as the set screw 304, and a triple-start thread is used as the set screw 318. However, the present invention is not limited to this, and any multi-start thread can be used as long as the number of starts of the thread is equal to or more than two.

In the above embodiment, the holder 208 has the template mount portion 297 and lens mount portion 313 and hence can hold both the frame template 300 and the lens 207. However, the present invention is not limited to this, and a dedicated frame template holder and dedicated lens holder may be used.

Assume that the shape of a rimless spectacle frame is to be measured. In this case, as described above, if the holder and spectacle frame shape measuring apparatus according to the present invention are used, since the set screw can be fastened and loosened within only one turn, the frame template can be quickly attached to and detached from the holder, improving the handling. In addition, since it is only required to form a pin guide groove in the set screw in the axial direction and insert a fixing pin into the screw mount hole, the structure can be simplified and manufactured at a low cost.

Furthermore, the holder according to the present invention uses a multi-start thread as a set screw for releasing the leap cup from the pressed state by the leap press, a leans can be quickly attached and detached.

In the above embodiment, the detection pin 295 extends vertically at a position shifted from the center of the fixed portion 290A of the holder 208 in the width direction to the left side to prevent the holder from being erroneously mounted on the holder mount portion B after it is turned over. However, the present invention is not limited to this, and the detection pin 295 may be provided in the center of the fixed portion in the widthwise direction.

The spectacle frame shape measuring apparatus according to the present invention has the first and second fixing portions on the holder mount portion of the housing, and the sensors on the respective fixing portion. Therefore, whether a frame template or lens is to be measured can be automatically discriminated in accordance with the mount position of the holder.

In addition, if sensors are provided in twos on the respective fixing portions, whether measurement for the left eye or right eye can be simultaneously discriminated. In this case, therefore, the operator need not designate a measurement mode or measurement for the left eye or right eye for each operation by operating the operation button, thus improving the handling. This can also prevent any artificial designation error.

In addition, if a detection pin detected by the first, second, third, or fourth sensor is provided at a position shifted from the center of the holder to the left or right, the operator can be prevented from erroneously mounting the holder upon turning it over.

What is claimed is:

1. A spectacle frame shape measuring apparatus comprising
    a measurement element holding mechanism which holds a measurement element in a substantially loadless state along a frame groove formed in an inner circumferential surface of a rim of a spectacle frame,
    said measurement element holding mechanism including
    a vertically movable rod having an upper end portion on which the measurement element is mounted,
    a balance spring which pushes the rod upward to hold the measurement element at a loading position during shape measurement, and
    releasing mechanism which regularly moves the measurement element to a lowered position,
    wherein, at the time of the shape measurement of a rim, said spectacle frame shape measuring apparatus performs three-dimensional measurement of a rim shape in a substantially loadless state of the measurement element.

2. An apparatus according to claim 1, further comprising:
    a slider which makes said measurement element holding mechanism movable in left and right directions; and
    a constant force spring which always biases said slider in one of the left and right directions.

3. An apparatus according to claim 1, wherein the releasing mechanism comprises:
    a pivot lever which pushes the rod downward against a spring force of the balance spring to evacuate the rod from the loading position to the lowered position;
    a biasing spring which has a spring force larger than the balance spring and presses the pivot lever against the rod; and
    a lowered state releasing driving unit which releases the rod from a pressed state by the pivot lever by pushing the pivot lever against the biasing spring during shape measurement of a rim.

4. An apparatus according to claim 3, wherein the rod has a pin which engages with the pivot lever.

5. An apparatus according to claim 1, wherein
    said apparatus further comprises a movable member which includes said measurement element holding mechanism an vertically moves together with the rod, and
    a spring force of the balance spring is set to be slightly larger than a weight of the movable member.

6. An apparatus according to claim 1, wherein
    the measurement element includes:
    a main body mounted on an upper end of the rod; and
    a contact portion which comes into contact with a frame groove formed in an inner circumferential surface of a rim of a spectacle frame,
    the contact portion is formed into a hemispherical shape, and
    a diameter D of the contact portion is 16 mm D<2.2 mm.

7. An apparatus according to claim 1, wherein
    said apparatus further comprises a Z-axis measuring unit which detects a displacement of the rod in a vertical direction as a displacement of the measurement element in a vertical direction,
    the Z-axis measuring unit includes a sensor rod which is adjacent and parallel to the rod, and a sensor head which is disposed adjacent to the sensor rod, and
one of the sensor head and the sensor rod operates in synchronism with moving of the rod in a vertical direction.

8. An apparatus according to claim 7, wherein the sensor head comprises a magnetic sensor.

9. A spectacle frame shape measuring apparatus holder which holds a frame template used to measure a frame shape of a rimless spectacle frame shape, comprising:
    a holder body having a template mount portion;
    a set screw which extends through a central hole formed in the center of the frame template to fix the frame template to the template mount portion; and
    a fixing pin which fixes said set screw to the template mount portion,
    wherein said set screw has a male thread portion,
    the template mount portion has a mount hole in which said set screw is inserted,
    said set screw has a pin guide groove which is formed in a surface of the male thread portion in an axial direction, and
    said fixing pin has a distal end portion protruding into the screw mount hole from a direction orthogonal to an axis of the screw mount hole, is located in the pin guide groove when inserted into the screw mount hole, and engages with a thread groove of the male thread portion of said set screw to fix said set screw when said set screw is fastened.

10. A holder according to claim 9, wherein said set screw is a multi-start thread.

11. A spectacle frame shape measuring apparatus holder which holds a frame template used to measure a frame shape of a rimless spectacle frame shape, comprising
    a holder body having a lens mount portion,
    the lens mount portion including
    a cup shaft fixed in said holder body,
    a leap cup which is detachably fitted on the cup shaft and holds a lens,
    a lens press shaft which has a leap press for fixing the leap cup to said holder body by pressing the leap cup from a direction orthogonal to an axis of the leap cup and is movably disposed in said holder body,
    biasing means for biasing the lens press halt in a direction in which the leap press presses the leap cup, and
    a set screw which is threadably engaged with said holder body and releases the leap cup from a pressed state produced by the leap press by moving the lens press shaft in a direction opposite to a biasing direction of he biasing means.

12. A holder according to claim 11, wherein the set screw is a multi-start thread.

13. A holder comprising a spectacle frame shape measuring apparatus holder which holds a frame template used to measure a frame shape of a rimless spectacle frame shape, and a holder mount portion which mounts said holder,
    said holder including
    a holder body having a template mount portion,
    a set screw which extends through a central hole formed in the center of the frame template to fix the frame template to the template mount portion, and
    a fixing pin which fixes said set screw to the template mount portion,
    wherein said set screw has a male thread portion, the template mount portion has a mount hole in which said set screw is inserted, said set screw has a pin guide groove which is formed in a surface of the male thread portion in an axial direction, and said fixing pin has a distal end portion protruding into the screw mount hole from a direction orthogonal to an axis of the screw mount hole, is located in the pin guide groove when inserted into the screw mount hole, and engages with a thread groove of the male thread portion of said set screw to fix said set screw when said set screw is fastened.

14. A holder comprising a spectacle frame shape measuring apparatus holder which holds a frame template used to measure a frame shape of a rimless spectacle frame shape, and a holder mount portion which mounts said holder, said holder including a holder body having a lens mount portion, and the lens mount portion including a cup shaft fixed in said holder body, a leap cup which is detachably fitted on the cup shaft and holds a lens, a lens press shaft which has a leap press for fixing the leap cup to said holder body by pressing the leap cup from a direction orthogonal to an axis of the leap cup and is movably disposed in said holder body, biasing means for biasing the lens press shaft in a direction in which the leap press presses the leap cup, and a set screw which is threadably engaged with said holder body and releases the leap cup from a pressed state produced by the leap press by moving the lens press shaft in a direction opposite to a biasing direction of the biasing means.

15. A spectacle frame shape measuring apparatus which measures a shape of a frame groove of a spectacle frame, and an outer circumferential shape of a frame template or a lens, comprising a housing having a holder mount portion formed along one side edge of an opening portion which is open upward and in which the spectacle frame or the lens is inserted;

a holder which holds the frame template or the lens; and an automatic discrimination mechanism which is mounted on the holder mount portion and automatically discriminates measurement modes for the frame template and the lens, wherein said holder includes a template mount portion having one surface on which a left or right frame template is mounted, and a lens mount portion having the other surface which is opposite to said one surface and on which a left or right lens is mounted, said holder is turned over and mounted on the holder mount portion such that the frame template faces down when the frame template is to be measured, and the lens faces down when the lens is to be measured, the holder mount portion includes a first fixing portion on which said holder is fixed when the left frame template or lens is to the measured, and a second fixing portion on which the right frame template or lens is to be measured, and said automatic discrimination mechanism includes a first sensor which is disposed on the first fixing portion and detects that said holder is mounted, and a second sensor which is disposed on th second fixing portion and detects that said holder is mounted.

16. A spectacle frame shape measuring apparatus which measures a shape of a frame groove of a spectacle frame, and an outer circumferential shape of a frame template or a lens, comprising:

a housing having a holder mount portion formed along one side edge of an opening portion which is open upward and in which the spectacle frame or the lens is inserted;

a holder which holds the frame template or the lens; and an automatic discrimination mechanism which is mounted on the holder mount portion and automatically discriminates measurement modes for the frame template and the lens, wherein said holder includes a template mount portion having one surface on which a left or right frame template is mounted, and a lens mount portion having the other surface which is opposite to said one surface and on which a left or right lens is mounted, said holder is turned over and mounted on the holder mount portion such that the frame template faces down when the frame template is to be measured, and the lens faces down when the lens is to be measured, the holder mount portion includes a first fixing portion on which said holder is fixed when the left frame template or lens is to be measured, and a second fixing portion on which the right frame template or lens is to be measured, and said automatic discrimination mechanism includes a first sensor which is disposed on the first fixing portion and detects that the left frame template is mounted, a second sensor which detects that the left lens is mounted, a third sensor which is disposed on the second fixing portion and detects that the right frame template is mounted, and a fourth sensor which detects that the right lens is mounted.

17. An apparatus according to claim 16, wherein said holder comprises a detection pin which is detected by the first, second, third, or fourth sensor.

* * * * *

UNITED STATES PATENT AND TRADEMARK OFFICE
CERTIFICATE OF CORRECTION

PATENT NO. : 6,845,678 B2  
APPLICATION NO. : 10/409974  
DATED : January 25, 2005  
INVENTOR(S) : Igarashi et al.

It is certified that error appears in the above-identified patent and that said Letters Patent is hereby corrected as shown below:

COL. 33, LN 46  
In Claim # 5, Line #4, please delete "an" and insert -- and --.

COL. 33, LN 59  
In Claim #6, Line #9, please delete "16" and insert -- 1.6 --.

COL. 34, LN 51  
In Claim #11, Line #18, please delete "he" and insert -- the --.

COL. 36, LN 5  
In Claim #15, Line #26, please delete "the" and insert -- be --.

Signed and Sealed this

Twenty-third Day of October, 2007

JON W. DUDAS  
*Director of the United States Patent and Trademark Office*